(12) United States Patent
Aurongzeb et al.

(10) Patent No.: US 10,013,228 B2
(45) Date of Patent: Jul. 3, 2018

(54) SYSTEM AND METHOD FOR POSITIONING AN APPLICATION WINDOW BASED ON USAGE CONTEXT FOR DUAL SCREEN DISPLAY DEVICE

(71) Applicant: Dell Products, LP, Round Rock, TX (US)

(72) Inventors: Deeder M. Aurongzeb, Round Rock, TX (US); Mark W. Welker, Westlake Hills, TX (US); Abu S. Sanuallah, Austin, TX (US); Claude L. Cox, Austin, TX (US); Joseph Kozlowski, Hutto, TX (US); Jorge A. Abullarade, Austin, TX (US); Knut Graf, Austin, TX (US); Kenneth W. Stufflebeam, Georgetown, TX (US)

(73) Assignee: Dell Products, LP, Round Rock, TX (US)

(*) Notice: Subject to any disclaimer, the term of this patent is extended or adjusted under 35 U.S.C. 154(b) by 67 days.

(21) Appl. No.: 15/346,657

(22) Filed: Nov. 8, 2016

(65) Prior Publication Data

US 2017/0052751 A1    Feb. 23, 2017

Related U.S. Application Data

(63) Continuation of application No. 14/101,612, filed on Dec. 10, 2013, now Pat. No. 9,524,139, which is a
(Continued)

(51) Int. Cl.
*G06F 3/14* (2006.01)
*G06F 3/02* (2006.01)
(Continued)

(52) U.S. Cl.
CPC .......... *G06F 3/1423* (2013.01); *G06F 1/1618* (2013.01); *G06F 1/1643* (2013.01);
(Continued)

(58) Field of Classification Search
None
See application file for complete search history.

(56) References Cited

U.S. PATENT DOCUMENTS 6,094,341 A    7/2000    Lin
7,136,282 B1    11/2006    Rebeske
(Continued)

FOREIGN PATENT DOCUMENTS

WO    WO 2012/044516 A2    5/2012
WO    WO 2013/107318 A1    7/2013

OTHER PUBLICATIONS

N. Ravi, J. Scott, H. Lu, L. Iftode, "Context-aware Battery Management for Mobile Phones," In Pervasive Computing and Communications, p. 224-233, 2008, p. 1-10.
(Continued)

*Primary Examiner* — James A Thompson
(74) *Attorney, Agent, or Firm* — Prol Intellectual Property Law PLLC; H. Kenneth Prol

(57) ABSTRACT

An information handling system includes a primary integrated display device housing and a second integrated display device housing attached via a hinge and a processor to determine a first relative orientation of the primary integrated display device housing to the second integrated display device housing from a plurality of orientation sensors. The processor further determines a working software application context by detecting at least a first software application running on the information handling system wherein the working software application context further includes an operating state rank of the first software appli-
(Continued)

cation relative to other software applications. The processor detects a required user input to the first software application and alters a location of a first software application display window and a virtual input softkey on a display device based on the first relative orientation and displaces second software application window of a second software application with a previously-higher the operating state rank.

20 Claims, 13 Drawing Sheets

Related U.S. Application Data continuation of application No. 14/066,484, filed on Oct. 29, 2013, now Pat. No. 9,727,134.

(51) Int. Cl.
    *G06F 3/0487* (2013.01)
    *G06F 3/0488* (2013.01)
    *G06F 3/01* (2006.01)
    *G06F 1/16* (2006.01)
    *G06F 1/32* (2006.01)
    *H04N 7/15* (2006.01)

(52) U.S. Cl.
    CPC .......... *G06F 1/1649* (2013.01); *G06F 1/1677* (2013.01); *G06F 1/1686* (2013.01); *G06F 1/1694* (2013.01); *G06F 1/3231* (2013.01); *G06F 1/3265* (2013.01); *G06F 3/013* (2013.01); *G06F 3/0227* (2013.01); *G06F 3/0487* (2013.01); *G06F 3/04886* (2013.01); *G06F 3/1446* (2013.01); *H04N 7/15* (2013.01); *G09G 2356/00* (2013.01); *Y02D 10/153* (2018.01); *Y02D 10/173* (2018.01)

(56) References Cited

U.S. PATENT DOCUMENTS

| | | | |
|---|---|---|---|
| 7,821,780 B2 | 10/2010 | Choy | |
| 8,261,212 B2 | 9/2012 | Wigdor | |
| 9,524,139 B2* | 12/2016 | Aurongzeb | H04N 7/15 |
| 2003/0142469 A1 | 7/2003 | Ponx | |
| 2005/0237269 A1 | 10/2005 | Connor et al. | |
| 2006/0026535 A1 | 2/2006 | Hotelling et al. | |
| 2006/0109259 A1 | 5/2006 | Ohta | |
| 2008/0311958 A1* | 12/2008 | Oswald | G06F 1/1622 |
| | | | 455/566 |
| 2009/0296331 A1 | 12/2009 | Choy | |
| 2010/0031203 A1 | 2/2010 | Morris et al. | |
| 2011/0032199 A1 | 2/2011 | Seo et al. | |
| 2012/0176353 A1* | 7/2012 | Ishii | G06F 1/1616 |
| | | | 345/204 |
| 2012/0031439 A1 | 12/2012 | Bohn | |
| 2013/0127905 A1 | 5/2013 | Zhang et al. | |
| 2013/0176291 A1* | 7/2013 | Leonard | G09G 5/10 |
| | | | 345/207 |
| 2013/0201101 A1 | 8/2013 | Niu et al. | |
| 2013/0321265 A1* | 12/2013 | Bychkov | G06F 3/013 |
| | | | 345/156 |
| 2014/0009445 A1 | 1/2014 | Kim et al. | |
| 2014/0247208 A1* | 9/2014 | Henderek | G06F 3/0481 |
| | | | 345/156 |

OTHER PUBLICATIONS

Marek Novotny, "Microsensors for Contactless Angle Sensing," Sep. 23, 2014 http://www.ac.tut.fi/aci/courses/ACI-51106/pdf/Angle/AngleSensing.pdf, p. 1-9.

This End Up: Using Device Orientation, by Pete LePage, Apr. 29, 2011, http://www.html5rocks.com/en/tutorials/device/orientation/, p. 1-17.

Sony Tablet p—Dual screen for maximum mobility, Get more done on the go with two 13.9 cm (5.5") touch screens, 1GB RAM, MicroSD card storage, ultra light and compact design, Wi-Fi and 3G, http://www.sony.co.uk/product/sony-tablet-p/tab/overview, p. 1-12.

NEC Unveils Bizarre Dual-Screen Medias W N-05E CNET Editor's Take, Feb. 26, 2013, http://www.cnet.com/products/nec-medias-w-n-05e/, p. 1-8.

Position Sensors; Android Developers, Sep. 6, 2013; http://developer.android.com/guide/topics/sensors/sensors_position_html, p. 1-5.

Passive and Active Cooling Modes; Oct. 12, 2013, http://msdn.microsoft.com/en-us/library/windows/hardware/hh698271(v=vs.85).aspx, p. 1-2.

"Procedure for Developing Intuitive and Ergonomic Gesture Interfaces for Man-Machine Interaction," Nielsen, Aalborg University, Laboratory of Computer Vision and Media Technology, Denmark, Technical Report CVMT 03-01, ISSN 1601-3646, CVMT, Aalborg University, Mar. 2003, pp. 1-12.

\* cited by examiner

SYSTEM AND METHOD FOR POSITIONING AN APPLICATION WINDOW BASED ON USAGE CONTEXT FOR DUAL SCREEN DISPLAY DEVICE

This application is a continuation of U.S. patent application Ser. No. 14/101,612, entitled "System and Method for Positioning an Application Window Based on Usage Context for Dual Screen Display Device," filed on Dec. 10, 2013, which is a continuation-in-part of U.S. patent application Ser. No. 14/066,484, entitled "System and Method for Display Power Management for Dual Screen Display Device," filed on Oct. 29, 2013, the disclosures of which are hereby expressly incorporated by reference in its entirety.

CROSS REFERENCE TO RELATED APPLICATIONS

U.S. application Ser. No. 14/078,775, filed Nov. 13, 2013, entitled "Dynamic Hover Sensitivity and Gesture Adaptation in a Dual Display System," invented by Lawrence E. Knepper et al., and assigned to the assignee hereof.

FIELD OF THE DISCLOSURE

This disclosure generally relates to dual display information handling systems, and more particularly relates to determining position of an application window on a dual display information handling system having multiple dual screen orientations.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display screens for output of images and for input such as by touch screen operation. Multiple display screen information handling systems, such as dual display devices, may be devices with fully integrated display screens or display screens that are modularly connectable to the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
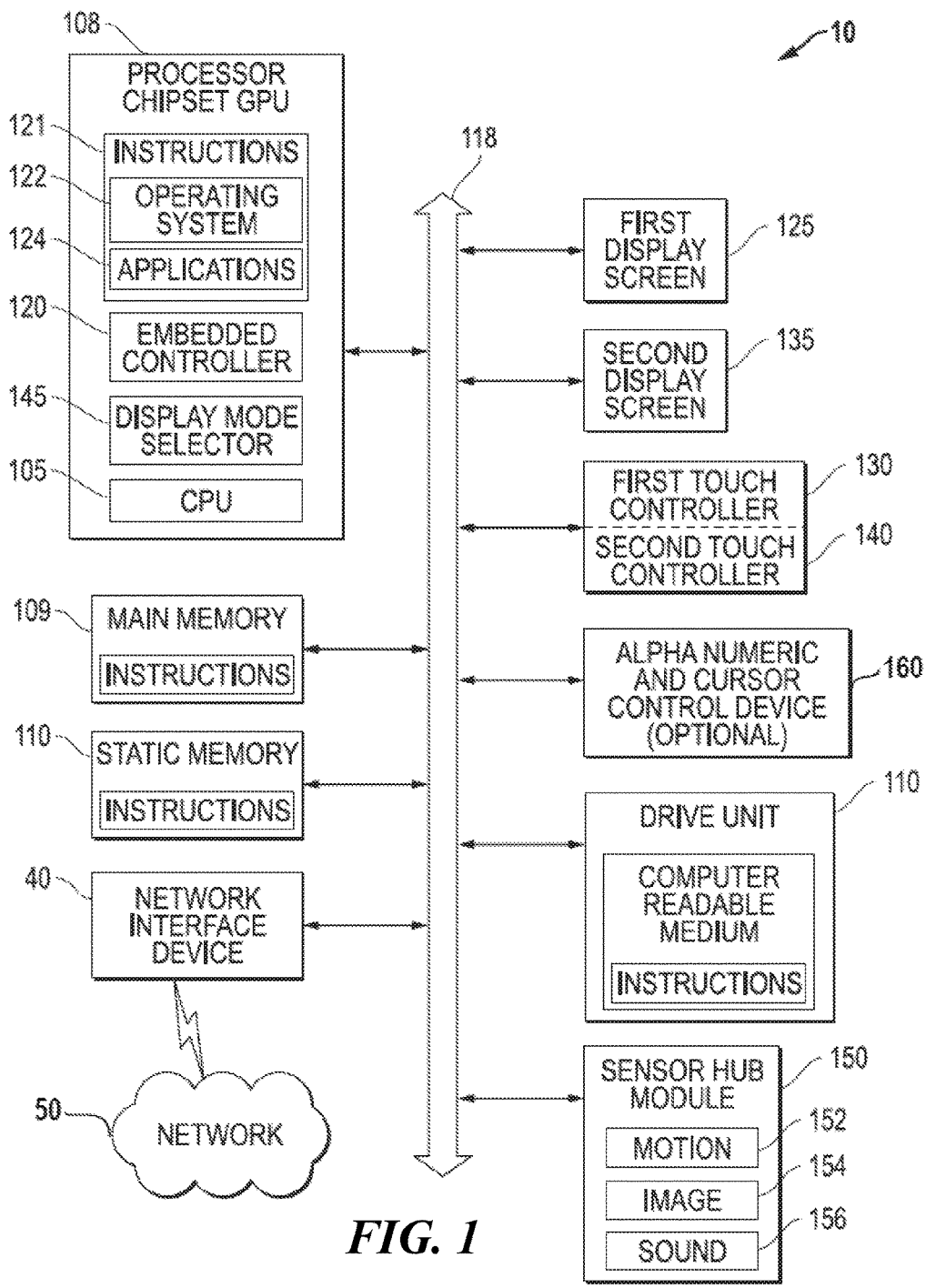
FIG. 1 is a hardware block diagram illustrating a dual display information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Additionally, traditional information handling system input devices such as keyboards and mouse systems are giving way to visual input interfaces such as touchscreens, hover detection, and motion sensing technologies. In many instances, it is substantially beneficial to implement a system with multiple display screens to interact with an information handling system. Optimal utilization of multiple display screens is desirable to facilitate usage of the extended display capabilities of an information handling system with two or more display screens. Display screens require substantial energy for operation which, in a mobile device environment, may heavily tax system performance and battery life. Orientation of a dual display information handling system and the context of the applications running thereon may be beneficially used to determine optimal location of software application windows and virtual interface tools based on the anticipated priorities of usage. Policies for anticipated usage and therefore location and prioritization of software display windows and virtual tools in a multitasking environment are described in several embodiments herein. Several factors are relevant in determining policies for anticipated usage. Factors may include ranked priority of software applications, orientation mode of a dual display information handling system, and determination of the location of a user or multiple users with respect to the display screens of a dual screen device.

FIG. 1 shows a dual display information handling system 10 including conventional information handling systems components of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA/smartphone, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) 105 and related chipset(s) 108 or hardware or software control logic. Additional components of system 10 may include main memory 109, one or more storage devices such as static memory or disk drives 110, an optional external input device 115 such as a keyboard, and a cursor control device such as a mouse, or one or more video displays 125 and 135. In the shown embodiment, the device is a dual display device with displays 125 and 135. The information handling system may also include one or more buses 118 operable to transmit communications between the various hardware components.

More specifically, system 10 represents a mobile user/client device, such as a dual screen mobile tablet computer. System 10 has a network interface device 40, such as for a wireless cellular or mobile networks (CDMA, TDMA, etc.), WIFI, WLAN, LAN, or similar network connection, enabling a user to communicate via a wired or wireless communications network 50, such as the Internet. System 10 may be configured with conventional web browser software. The web browser, may include for example Microsoft Corporation's Internet Explorer web browser software, Firefox or similar such browsers to allow the user to interact with websites via the wireless communications network 50.

System 10 may include several sets of instructions to be run by CPU 105 and any embedded controllers 120 on system 10. One such set of instructions includes an operating system 122 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 124 may be run by system 10. These software applications 124 may enable multiple uses of the dual display information handling system as set forth in more detail below.

System 10 includes a first or primary display screen 125 and a second display screen 135. Each display screen has a display driver operated by one or more graphics processing units (GPUs) 106 such as those that are part of the chipset 108. Each display screen also has an associated touch controller 130, 140 to accept touch input on the touch interface of each display screen. It is contemplated that one touch controller may accept touch input from display screens 125 and 135, or as shown in the current embodiment, two touch controllers 130 and 140 may operate each display screen respectively. In the current embodiment, the first touch controller 130 is associated with the first display screen 125. The second touch controller 140 is associated with the second display screen 135.

The first display screen 125 and the second display screen 135 may also be controlled by the embedded controller 120 of chipset 108. Each GPU 106 and display driver is responsible for rendering graphics such as software application windows and virtual tools such as virtual keyboards on the displays 125 and 135. Control of the location and positioning of these windows may be set by user input to locate the screens or by control setting default. In several embodiments described herein, control of the location for rendering for software application windows and virtual tools in the dual displays may be determined by an application window locator system as described further in the embodiments herein. The application window locator system determines operating state rank of running software applications and determines whether and where to display application display windows and virtual tools based on relative orientation and state of usage information. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of dual display control via the disclosures herein, the power to the first display screen 125 and the second display screen 135 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screens and other components of the dual display information handling system.

A display mode selector 145, in connection with an application window locator system as described in more detail below, determines priority of concurrently running software applications and how to automatically locate software application display windows and virtual tools between the dual screens via the chipset 108 based upon orientation of the two display screens 125 and 135 as well as the software applications 124 currently running and active and their status. Determining which applications 124 are running determines a working software application context. Alternatively, the application window locator may operate on a embedded controller 120 separate from the main CPU chipset(s) 108. Additionally, the power management application may receive state of usage activity input from device state sensors.

System 10 of the current embodiment has a system sensor module 150. Various orientation sensors are included in this module to assist with determining the relative orientation of the dual display information handling system. Subcategories of orientation sensors include motion sensors 152, image sensors 154, and sound sensors 156. Other orientation sensors are contemplated as well including state of usage activity sensors as discussed in more detail below with FIG. 2. Sensor system module 150 is a sensor hub, or an accumulator device, that collects raw data from connected orientation sensors, and organizes and processes data received from the connected sensors. The sensor hub also processes raw sensor data to groom the raw sensor data into a useable form of positional analysis for the dual display information handling system and its display screens. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset via a bus connection such as an Inter-Integrated Circuit (I2C) bus or other suitable type of multi-master bus connection.

The sensor data from the sensor hub is then further groomed by the power management application and the display mode selector 145. A relative orientation of the dual display information handling system in space, the orientation of the two display screens with respect to one another, consideration of state of usage activity data, and working software application context are determined by the application window locator system and the display mode selector 145 at CPU 105 and/or embedded controller 120. This relative orientation data of the dual display information handling system, the rank of software applications running, the rank of the state of the operating state for the software applications, and the working software application context are used by application window locator system and display mode selector 145 to determine locations of software application display windows and virtual tools among the display screens.

Typically, system 10 may also include microphones and speakers for audio input and output (not shown). The microphones and speakers are connected through an HDA Codec such as the Realtek ALC 5642 or similar such codec. Data from the microphones may serve motion sensing using a Doppler Effect detection of display screen locations. This is discussed further below.

Figure 2:
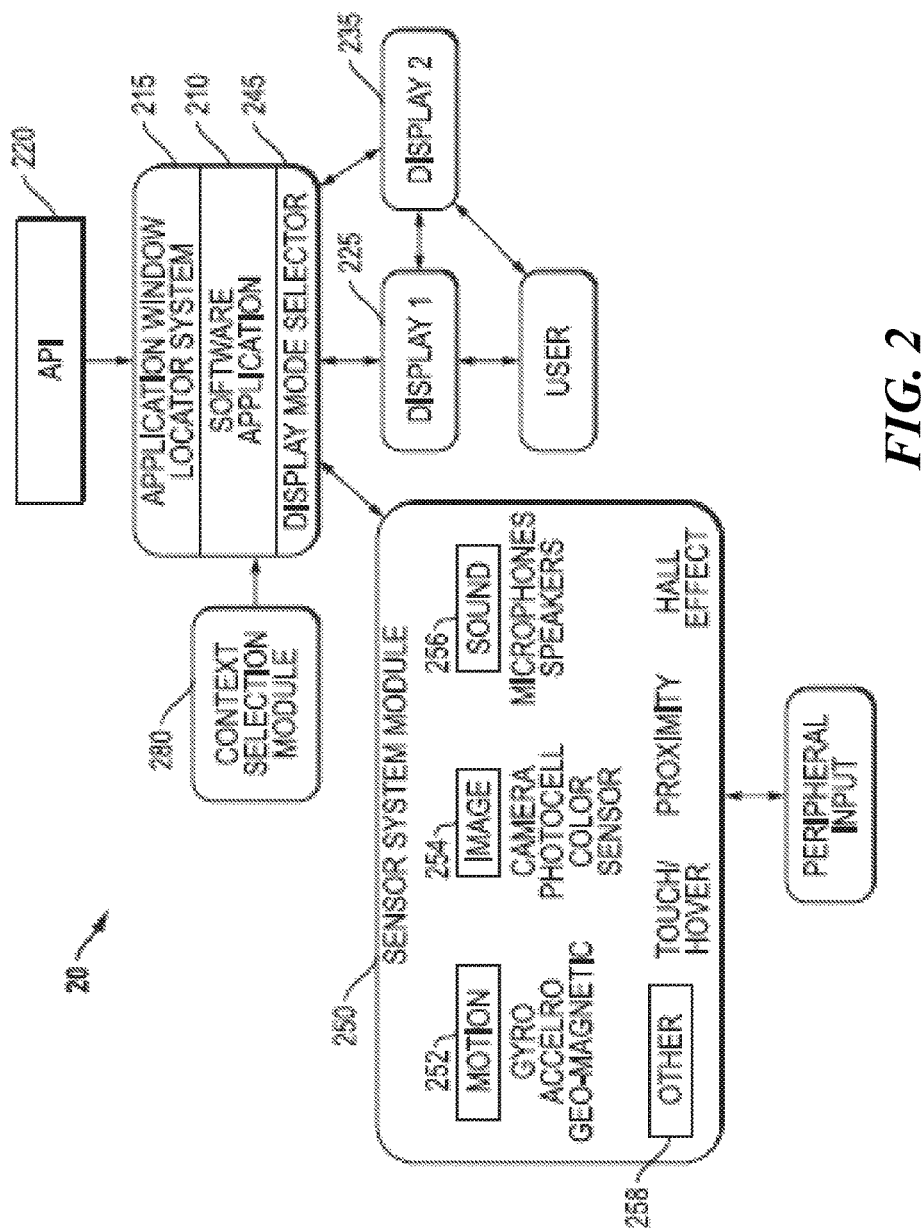
FIG. 2 illustrates a block diagram illustrating the sensors module and working software application context selection module integrated with the power management of a dual display information handling system according to an embodiment of the present disclosure.

FIG. 2 illustrates a system block diagram of a dual display power management system 20 including sensor module 250 and context selection module 280. Also shown are the first display screen 225 and the second display screen 235 integrated into the dual display information handling system of the current embodiment. The dual display power management system includes a power management application 210, an application window locator system 215, and display mode selector 245 that comprises a set of instructions run on CPU 105 or embedded controller 120 in the chipset(s) 108. The power management application 210, the window locator system 215, and the display mode selector 245 interface with the application programming interface (API) 220 found in the information handling system software to coordinate various software applications. The API may coordinate the display mode selector 245, sensor hub input data, other independent sensor input types such as camera or touch hover detection applications, display device drivers, PMU/BMU applications controlling power, and the window locator system application 215 and display manager, such as a windows manager, determine commands input to the GPU and display device drivers to render and locate the software display windows and virtual tools.

The power management application 210, the application window locator system 215, and display mode selector 245 receive data from the sensor system module 250 that includes an accumulator sensor hub that gathers sets of data from some or all of the orientation sensors shown. The orientation sensor types include motion sensors 252, image sensors 254, sound sensors 256, and other sensors 258. Some orientation sensors are connected through the sensor hub or accumulator device and system. Other orientation sensors may directly provide data to the dual screen dual display power management system 210, the application window locator system 215, or the display mode selector 245. For example, the camera system and detection of gaze or presence of a user can operate on a different set of drivers and data be groomed by a software application running on the chipset(s) 108 processors to interpret camera input. This data is then provided to the dual display screen dual display power management system 210, the dual display the application window locator system 215, and the display mode selector 245.

Motion sensors 252 may include one or more digital gyroscopes, accelerometers, and magnetometers. Motion sensors 252 may also include reference point sensors. For example, a geomagnetic field sensor may determine position of one or both display screens of the dual-screen information handling system and or the overall dual display information handling system device itself. This positional information may provide x-axis, y-axis, and z-axis positional information of the dual display information handling system relative to magnetic north pole, and there for a reference point of the device position. In one embodiment, two geomagnetic field sensors provide x-axis, y-axis, and z-axis positional information for each display screen of the dual display information handling system. With this data, the system determines the relative position of the two display screens to one another in orientation.

Also, a digital gyro and accelerometer may be used to detect motion and changes in position. These sensors may provide a matrix of data. In an example embodiment, the azimuth or yaw, pitch, and roll values of the device are indicated by the raw sensor data. The raw orientation data for the entire dual screen device may be relevant to the dual display power management system 210 or software window locator system 215. In another embodiment, determination of azimuth, pitch, and roll data may be made of individual display screens 225 and 235 in the dual screen power management system 20. In a further embodiment, the two individual display screens are integrably hinged together along one side each display screen. Thus, relative positions of each individual display screen 225 and 235 are important input data to determining the logical location of application display windows as well as power saving measures described herein.

In connection with a reference point, such as magnetic north as provided in one embodiment by a geomagnetic field sensor, the azimuth can be determined as a degree of rotation around a z-axis. Note this is different from hinge azimuth angle discussed further below. In an embodiment, the azimuth may be the value of the z-axis relative to the device y-axis as positive angle values between 0° and 360°. It is understood that a different range of values may be assigned in different embodiments.

Based on a reference point such as provided by a geomagnetic field sensor, pitch may be determined as a degree of rotation around the x axis. In an example embodiment, the angle values may range from positive 180° to negative 180° relative to the y-axis, although other value ranges may be assigned instead.

Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

The matrix of raw sensor data from the geomagnetic field sensor and the gyro and accelerometer sensors may be processed partly by a sensor hub or accumulator to provide orientation data for the dual display information handling system device. The sensor hub performs a fusion of data signals received from either a single sensor or multiple sensor devices. As described above in reference to FIG. 1, the sensor hub also processes raw sensor data to groom the raw sensor data into a useable form of positional analysis for the dual display information handling system and its display screens. In the example embodiment, the sensor hub is an independent microcontroller such as the STMicro Sensor Fusion MCU.

No more than three orientation sensors are needed. A reference sensor and a motion sensor associated is attached to one display screen to determine its orientation. A second sensor which is either another reference sensor or a motion sensor associated with or attached to the second screen to provide enough information of location or movement of the second display screen relative to the first display screen to determine the overall orientation mode of the dual display information handling system. Algorithmic calculation of the sensor data from the first display screen, such as a geomagnetic field reference sensor and an accelerometer motion sensor, may be used to determine the orientation of the first display screen according to a geomagnetic field or other reference point. Additional algorithmic calculations of movement data or differences in reference point data from the second display screen are used to determine position or orientation of the second display screen in space relative to the first display screen. The fixed location of the hinge and determination of the position of and relative angle between each of the two display screens also yields positional information on a hinge azimuth angle. The hinge azimuth angle, different from the raw azimuth z-axis measurement discussed above, relates to the orientation of the hinge axis relative to a detected users viewing line or relative to the viewing line most likely to be used by a viewer based on the dual display device's current configuration.

In one example embodiment, two digital gyroscopes may be used, one for each display screen of the dual display information handling system, and a geomagnetic field reference sensor may be used in association with either display screen. In yet another example embodiment, two accelerometers may be used in addition to a reference sensor, one for each display screen of the dual display information handling system. Some sensor types may be combination sensor devices in certain embodiments as is known in the art. For example, a motion sensor may be used that combines the functions of a digital gyroscope and accelerometer to detect motion. Thus, one accelerometer and one digital gyroscope or two gyro-accelerometer combination devices may be used along with at least one reference sensor to determine the dual display information handling system orientation. Any combination of the above reference sensors and motion sensors may be used in a three sensor embodiment to determine orientation of the display screens (e.g. relative angle) and the hinge azimuth angle.

It is contemplated that more sensors associated with each of the first and second display screens provide more data permitting increased accuracy in determination the dual display information handling system orientation. This has trade-offs however in materials cost, space occupancy, and power consumption. Use of dual sensor types in each display screen for the dual display device permits two sets of processed orientation data to be developed by the accumulator. With these two sets of data, display mode selector 245 of the central processor or the embedded controller may determine changes in movement of each display screen of the dual display device. These movement changes indicate relative position of these two display screens 225 and 235 to one another. This provides information permitting the system to understand the location and movement of each of the two display screens relative to one another as well as their position and movement in space overall. Such additional capability may provide more precise determination by the display mode selector of the intended display mode of the dual display information handling system.

The relative measurements of position in space relative to a reference point may be further processed relative to measurements of position from other sensors. For example azimuth, pitch, and roll may establish the position in space of one display screen. Then data from one or more sensors on a second display screen such as a gyroscope, may indicate a different azimuth, pitch, and roll for the second display screen. With position of the two display screens and a known hinge point (or points), the system determines a relative angle between the first display screen and a second display screen. Similarly, the system for determining orientation of the dual display device will know the location of a fixed hinge axis and based on positional information of the two display screens in space. Thus, the dual display power management system determines the hinge azimuth angle relative to the probable viewing line of a user. The viewing line of a user may also be detected with a camera detection system or other proximity sensor to recognize the location of a user relative to the dual display device.

Other techniques are also contemplated to determine relative position and movement of two display screens integrated into a dual display information handling system. For example, Doppler Effect sound sensors 256 may typically include one or more microphones and speakers used in connection with Doppler effect calculations to determine relative position of two display screens in a dual display information handling system. A transmitter and microphone receiver can detect a Doppler shift in sound or ultrasound signals to measure distance or location of the two display screens integrably hinged. In one example, the Doppler Effect sensors may operate in the 0-40 kHz range to detect relative location of the hinged dual screens in an open configuration.

Image sensors 254 may include a camera, photocell or color sensor. A photocell may detect the open or closed state of a dual display information handling system by determining hinged screens are no longer in a closed position when light is detected by the photocell. Additionally, the photocell may detect ambient light levels in determining brightness levels of one or more display screens. A photocell may even be used to indicate when one display screen is oriented face down on a surface such as a table while the other display screen may be actively displaying.

A camera may be used as an image sensor to provide several types of feedback. It may be used as a light sensor similar to a photocell. A camera may also be used to facilitate a reference point for orientation by detecting the presence and location of a user in front of one or more display screens of a dual display information handling system. Location of a user relative to one or both display screens provide a rough user viewing vector that may be used to determine display usage mode by the display mode selector 245. The camera may be tasked to sense the position of a user around the two screens (for example, directly in front, above, below, to the right, or to the left of the plane of the display screen) as well as using facial recognition capability as is known to the art to determine the orientation of the person's face. This information enables the system to correctly orient both displays on the display screens according to a viewing line of sight (or viewing vector) based on position and orientation of the user. The displays on each display screen may be oriented in landscape page orientation or portrait page orientation as well as determining which side should be the top of the display for each screen relative to the viewer.

A camera may also be used with gaze detection to determine which screen in a dual-screen information handling system is actively being viewed by a user. Determining which screen between the dual screens is being actively viewed provides additional data for the display mode selector and the dual display power management system application to determine power saving implementations that may be appropriate. Eye tracking and gaze technology implementations are available in the art from companies such as Synaptics, Inc. and Tobaii Technologies. Description of this technology is found at http://www.synaptics.com/about/press/press-releases/tobii-and-synaptics-unveil-concept-laptop-integrates-eye-tracking-and-touch (press release Jun. 25, 2013). Use of eye tracking and gaze technology in the present disclosure permits control over determination of which display screen is active in a dual display information handling system. Location of an application display windows may be selected for a non-active display screen depending on the application being used and physical orientation of the system. Also, power may be reduced to a non-active display screen depending on the application being used and physical orientation of the system.

In addition to motion sensors 252, image sensors 254, and sound sensors 256, other sensors 258 such as a variety of state of usage activity sensors are contemplated. For example, touch or hover sensors may detect which screen is actively being used. Proximity sensors may detect the location of a user relative to one or both display screens. Proximity sensors in one or both display screens may detect the position of a user around the two screens (for example, directly in front, above, below, to the right, or to the left of the plane of the display screen) and thus infer the viewing vector based on the position of the user or users. Proximity sensors may be a variety of types including infrared, radiofrequency, magnetic, capacitive or other techniques used to detect the surroundings of the information handling system. Similar to the camera, this proximity sensor information enables the system to correctly orient both displays on the display screens according to a viewing line of sight (or viewing vector) based on position and orientation of the user. The displays on each display screen may be oriented in landscape page orientation or portrait page orientation as well as determining which side should be the top of the display for each screen relative to the viewer. As described further below, a tilt of one or both display screens may also orient the display on the display screen via a gyroscope or accelerometer sensor providing this state of usage activity information.

Another state of usage activity sensor is a Hall Effect sensor that may detect when a magnet, of certain polarity and strength, is in proximity to the sensor. It is used to detect the closed position of a device with two sides. For example, a Hall Effect sensor may determine when two integrably hinged display screens are closed onto one another so that a magnet in one screen triggers a Hall Effect sensor in the second screen. Alternatively, a different Hall Effect sensor may determine if the hinged display screens are open to an orientation of 360° so that the back sides of the display screens are in proximity such that a magnet located with one display screen triggers the Hall Effect sensor of the other.

Hall Effect magnets and magnetic sensors may be deployed as a type of motion sensor 252 although it is also a position or state sensor. It is known in the art that a relative angle between a magnetic field source of known polarity and strength may be determined by strength and change to a magnetization vector detected by magneto-resistive detectors of a Hall Effect sensor. Thus, motion and relative angle may also be detected by the Hall Effect sensors. Other detectors are also contemplated such as a hinge angle detector that may be mechanical, electromechanical or another detecting method to determine how far the hinge between the two display screens has been opened. Such detectors are known in the art.

The context selection module 280 determines what software applications are operating on the dual screen information handling system. Categories of working software application contexts such as running office applications for database creation and word processing, note taking, accessing internet data applications, gaming, video playback entertainment, video and voice communications, email and other electronic communication, websurfing, music, mobile applications, and others are grouped according to similarities in usage on a dual screen information handling system. Websurfing and use of some types of mobile applications may have similar usage on a dual screen device.

The context selection module 280 detects active software applications and ranks the software applications based on a variety of factors. Priorities may be set via a priority policy table described further below and utilized by the window locator system application to arrange display locations of software display windows and virtual tools. Some software applications will take priority based on an operating state of the software which is determined from a context selection module 280. For example, an operating state may include whether a videoconference call application or a voice call application is receiving a current call. Another operating state may include a software application requesting input via a virtual tool such as a virtual keyboard. Yet another operating state may be a software application actively running or being actively used versus a software application downloading data. Additional operating states are contemplated for assessment by the context selection module 280 in determining the working software application contexts for one or more software applications running on a dual screen information handling system.

The working software application context data is provided to the display mode selection module 245 of the window locator system application 215 along with sensor data for orientation and state of usage activity data for determination of a usage mode and locating the software application display screens and virtual tools for display on the dual screen device.

Figure 3:
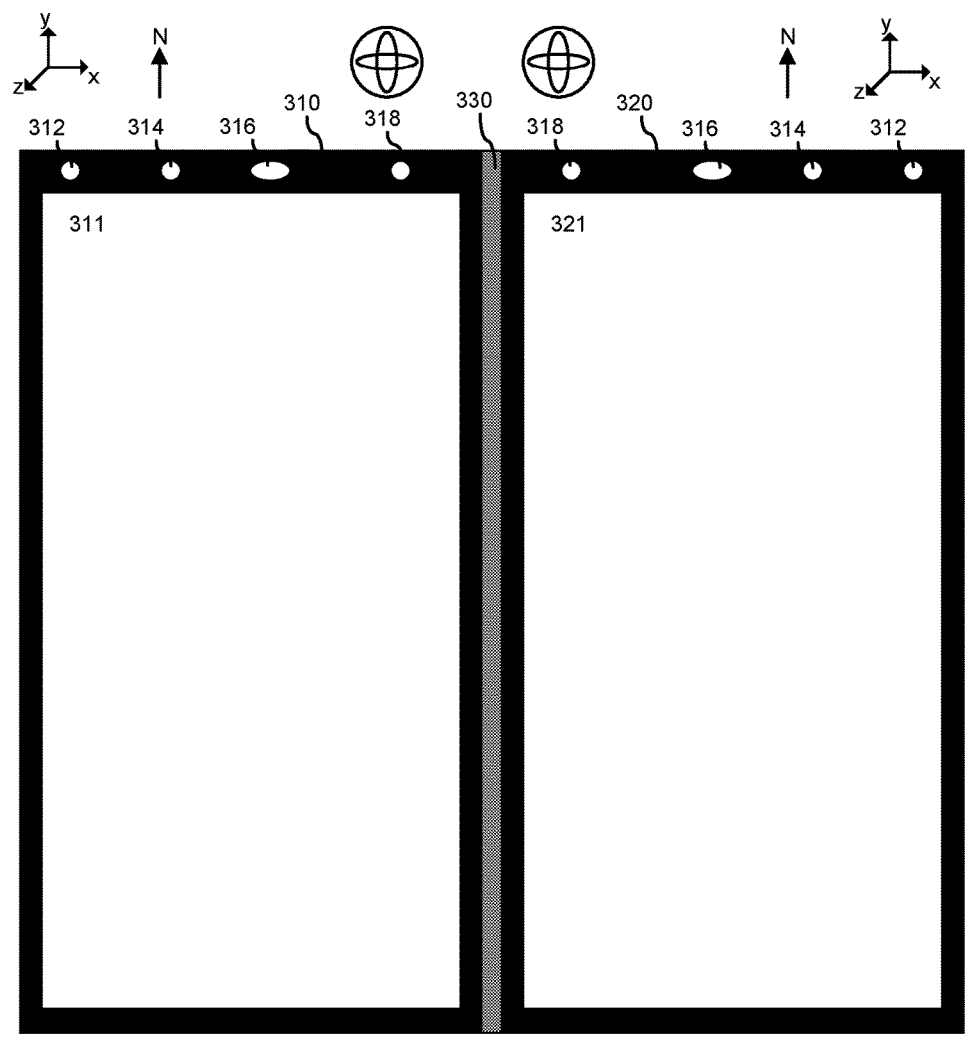
FIG. 3 illustrates an example dual display information handling system according to an embodiment of the present disclosure.

FIG. 3 shows an example of a dual display information handling system with two hinged display screens according to an embodiment of the invention. The dual display information handling system 300 has a first display screen 311 in housing 310 and a second display screen 321 in housing 320 in the disclosed embodiment. As illustrated in this embodiment, the dual display information handling system is in a portrait page orientation and the screens are oriented in a double tablet orientation with both the first display screen 311 and the second display screen 321 viewable. First display screen 311 and second display screen 321, or their housings 310 and 320, are connected via a hinge structure 330 along one side of each display screen. Hinge structure 330 may run most of the entire length of one side of each of the first display screen 311 or housing 310 and second display screen 321 or housing 320. Alternatively, one or more hinges may be connected only at portions of the edges of the two display screens 311 and 321 or their respective housings 310 and 320. For example, one hinge point connection may be sufficient at only one spot along the edge of the two display screens. In another embodiment, two connection points may be sufficient. In this example the two connection points may be near the ends of the hinged edges of the two display screens 311 and 321 in an example embodiment. The hinge connection 330 may include power and communication connections allowing information and power to be transferred between display screens 311 and 321 and their respective housings 310 and 320. This will provide flexibility on where to locate various processors, power sources, connections, and sensors as between the housings of display screens 311 and 321. In another embodiment, one or more display screens 311 and 321 may not require any housing and most or all components may be stored in the hinge connection 330 or the housing of the other display screen.

In yet another embodiment, the hinge connection 330 may be disconnectable to permit display screens 311 and 321 to operate as display screens connected by a wireless connection or as altogether independent information handling systems such as tablets. Magnetic connectivity may maintain the hinge structure 330 when a disconnectable hinge is connected. Wireless data connection between detachable display screens 311 and 321 may be made via wireless communication standards such as near field communication (NFC) per standards ISO 18000-3, ISO 13157 and related standards or low power Bluetooth based connections (e.g. IEEE 802.15.1) maintained between the detachable display screens. Separate power sources, such as batteries, may need to be provided for each of the display screens; however coordination of power savings strategies may still be utilized to preserve battery power on one or both devices in accordance with the disclosures herein.

FIG. 3 also illustrates various sensor components in a dual display information handling system embodiment according to the disclosures. One or both display screens or their respective housings may contain one or more accelerometers 312, geomagnetic sensors 314, cameras 316, or digital gyroscopes 318. Additional state sensors may also be present including a photocell ambient light sensor, a Hall Effect magnet and sensor, camera, touch/hover sensors, and other sensors as described above.

There is no requirement that all sensor types be present. For example, a sensor module may only need a motion detector and a reference sensor as described above for one display screen and another sensor in a second display screen. For example, either an accelerometer 312 or a gyroscope 318 and a reference sensor such as a geomagnetic sensor 314 may be associated with one display screen 311 while the other display screen 321 has a sensor to detect changes or differences between the two screens 311 and 321. The second screen may use a second geomagnetic sensor 314, or one motion sensor 312 or 318. There are even techniques known in the art of using a Hall Effect sensor or a Doppler shift sensor in the second display screen 321 to indicate changes in position as described above. The more sensor data available in each display screen 311 and 321 of the dual display information handling system, the better accuracy of the orientation data and less computing required to determine the positioning orientation. The down side however is added the expense, space, and power resources that many sensors will occupy in the dual display information handling system.

FIGS. 4-10 illustrate a plurality of exemplary embodiments of display orientation modes for a dual display information handling system with two display screen integrably hinged along one side. The display orientation modes reflect the orientation of the dual display information handling system in three dimensional space and the relative positions of the display screens to one another. Add to the display orientation such factors as the working software application context and the state of usage activity of the system, and the display mode selector associated with the dual display power management application and the application window locator system determines a usage mode for the dual display device. In some cases, working software application context or state of usage activity may have little or no input on determining the usage mode. In other cases, such data may be determinative of a usage mode.

In one embodiment, two display screens are connected by a 360° hinge along one side with data and power connections so that communications and power may be shared between each side having a display screen. In one particular embodiment, the 360° hinge also allows any orientation between the two hinged display screens is available at any relative angle in from 0° in a fully closed position to 360° where the dual display screens are open fully so that the opposite sides of the display screens contact one another. Several of these example display orientation modes are illustrated in FIGS. 4-10.

Figure 4:
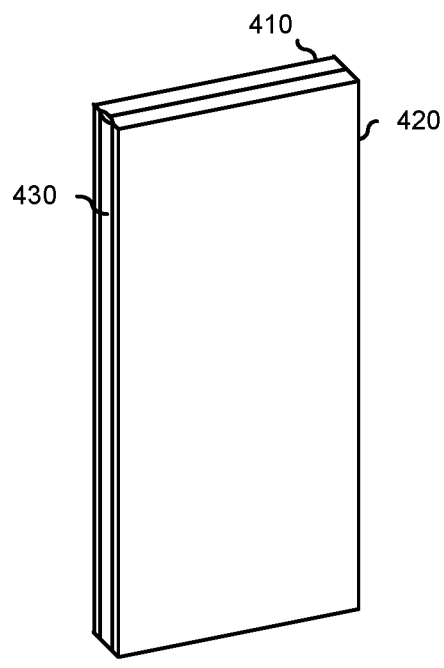
FIG. 4 illustrates an example dual display information handling system in closed mode orientation according to an embodiment of the present disclosure.

FIG. 4 shows an example of a dual display information handling system with two hinged display screens according to an embodiment of the invention. The dual display information handling system 400 has a first display screen housing 410 and a second display screen housing 420. As illustrated in this embodiment, the dual display information handling system is in a closed orientation with both the first display screen surface and the second display screen surface in contact with one another and closed internally as shown. First display screen housing 410 and second display screen housing 420 are connected via a hinge structure 430 along one side of each screen. In the shown embodiment, hinge structure 430 may run most of the entire length of one side of each display screen, but other hinge embodiments are contemplated as discussed with respect to FIG. 3 above.

Figure 5A:
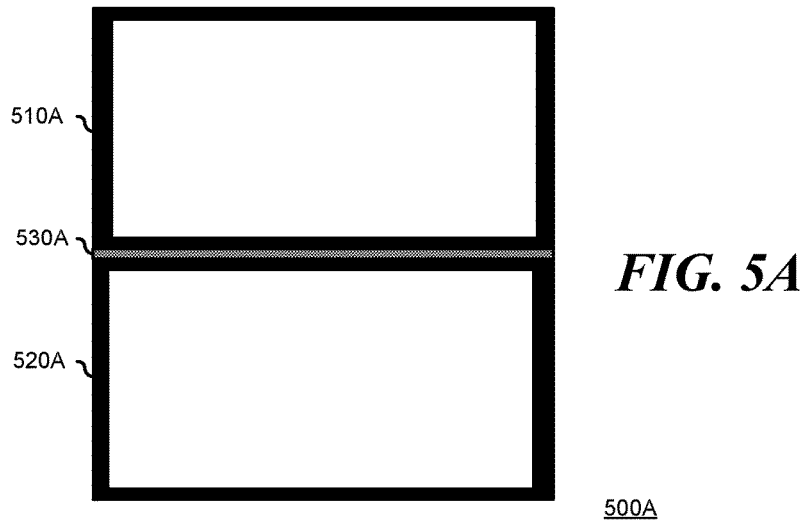
FIGS. 5A and 5B illustrate example dual display information handling systems in dual tablet mode orientations according to an embodiment of the present disclosure.

FIG. 5A illustrates a landscape page orientation for a dual screen system in double tablet orientation 500A of the present disclosure. In this orientation, a first display screen 510A and a second display screen 520A are connected via a hinge 530A having a hinge azimuth orientation at 0° or perpendicular to the sight line of a viewer. A tilt motion of the double tablet oriented device, for example by lifting the top edge relative to the bottom edge, may orient images on the two display screens to be viewable, in this case in a sight line from the bottom. Such a motion can activate accelerometers or another tilt detector to orient the viewable images. Alternatively, a camera sensor may be used to detect the location of a viewer or viewers to determine the orientation of the images on the display screens 510A and 520A for viewing. For example, the camera may detect a user at the bottom of the device and set the display with a sight line from the bottom. In these embodiments, the hinge 530A is designed so that the dual display information handling system may be arranged in an open position at approximately 180° where the front of both display screens are viewable. Display screens 510A and 520A may be combined virtually into a single viewable screen so images are viewable across both display screens for certain software applications. A range of dual tablet hinge angles are contemplated. Generally, if both display screens are viewable or combined as a single viewable screen, the system orientation may be considered double tablet mode. In one example embodiment, a double tablet orientation with landscape page orientation have a relative hinge angle of between approximately 160° and approximately 200°.

Figure 5B:
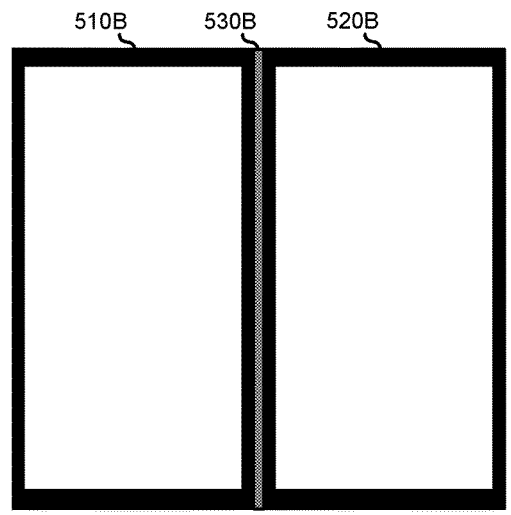

FIG. 5B illustrates a portrait page orientation for the dual display information handling system embodiment 500B in double tablet orientation of the present disclosure. In this orientation, a first display screen 510B and a second display screen 520B are connected via a hinge 530B having a hinge azimuth orientation at 90° or parallel to the sight line of a viewer. A tilt motion of the double tablet oriented device, for example by lifting the top edge relative to the bottom edge, may orient images on the two display screens to be viewable, in this case in a sight line from the bottom. Alternatively, a camera sensor may be used to detect the location of a viewer or viewers to determine the orientation of the images on the display screens 510B and 520B for viewing, for example in a sight line from the bottom. In these embodiments, the hinge 530B is designed so that the dual display information handling system may be arranged in an open position at approximately 180° where the front of both display screens are viewable. Display screens 510B and 520B may be combined virtually into a single viewable screen so images are viewable across both display screens for certain software applications. A range of dual tablet relative hinge angle between the two display screens is contemplated. Generally, if both display screens are viewable and combined as a single viewable screen, the system orientation may be considered double tablet mode. In one example embodiment, it is contemplated that a double tablet orientation with portrait page orientation have a relative hinge angle of between approximately 160° and approximately 200°.

Figure 6:
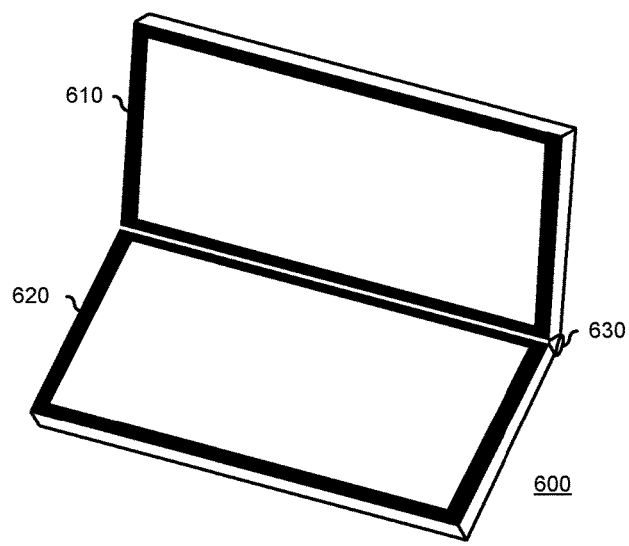
FIG. 6 illustrates an example dual display information handling system in laptop mode orientation according to an embodiment of the present disclosure.

FIG. 6 illustrates a laptop orientation 600 for the dual display information handling system embodiment of the present disclosure. In the embodiment of FIG. 6, a first display screen 610 and a second display screen 620 are connected via a hinge 630 having a hinge azimuth orientation at 0° or perpendicular to the sight line of a viewer. The hinge is designed so that the dual display information handling system may be arranged in an open position at approximately 100° relative angle between the two display screens and where the front of both display screens are viewable. A range of dual tablet orientation relative hinge angles between the two display screens is contemplated, so long as the lower or base display screen 620 is usable for an application interface such as a virtual keyboard. In one example embodiment, it is contemplated that laptop orientation have a relative hinge angle of between approximately 90° and approximately 120°.

Figure 7A:
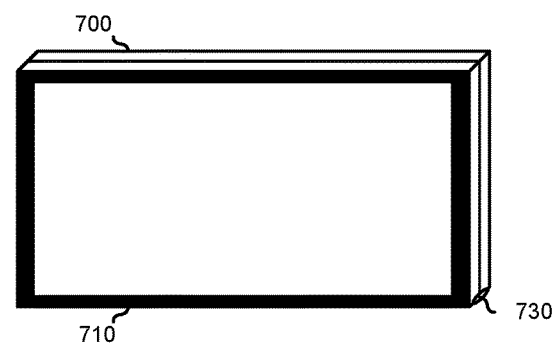
FIGS. 7A, 7B, and 7C illustrate example dual display information handling systems in tablet mode orientations according to an embodiment of the present disclosure.
Figure 7B:
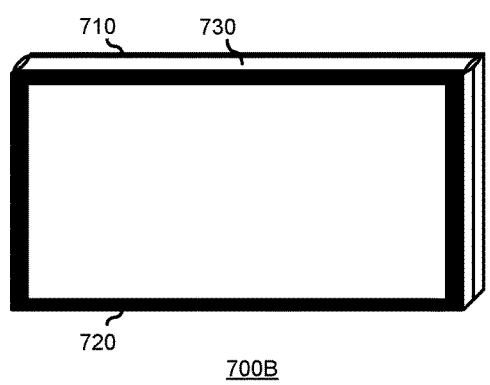
Figure 7C:
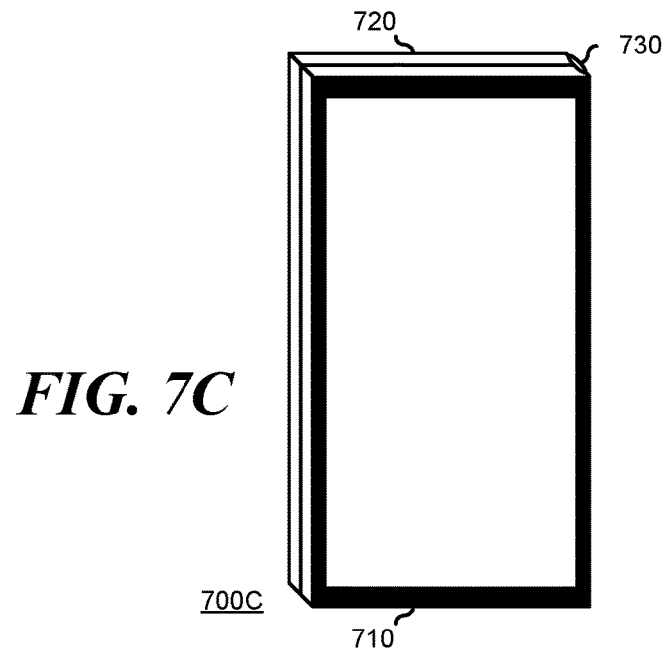

FIGS. 7A, 7B, and 7C illustrate tablet orientations 700A, 700B, and 700C for the dual display information handling system embodiment of the present disclosure. In the embodiments of FIG. 7A, 7B, and 7C, a first display screen 710 and a second display screen 720 are connected via hinge 730 where the hinge 730 is fully open so that the back sides of the two display screens 710 and 720 are in contact or nearly in contact. In orientation mode 700A, first display screen 710 is viewable and second display screen 720 is folded behind. Orientation of the device is in landscape page orientation in this embodiment. In orientation mode 700B, the second display screen 720 is viewable in the front of the device in landscape page orientation and the first display screen is folded behind. Orientation 700C is similar to orientation mode 700A except that the device is in a portrait page orientation. Not shown, a portrait page orientation mode with the second display screen viewable in the front of the device is also contemplated. In these tablet mode orientation embodiments, the relative hinge angle of hinge 730 is approximately 360°. A range of tablet orientation mode hinge angles is contemplated so long as one display screen is the primary viewed display screen. In one example embodiment, it is contemplated that tablet mode orientation have a relative hinge angle of between approximately 340° and approximately 360°.

Figure 8:
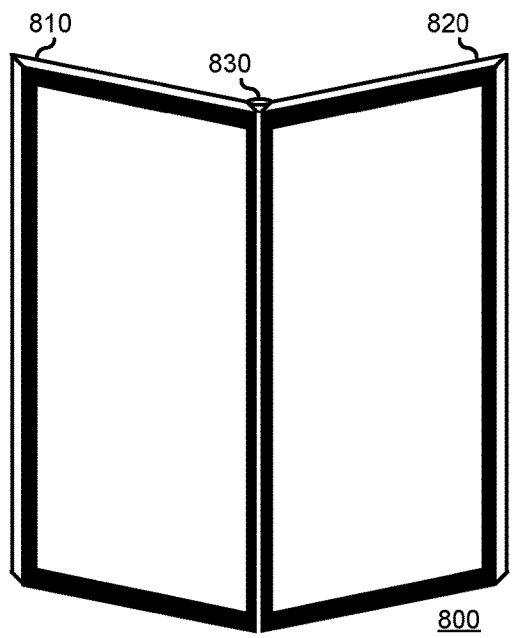
FIG. 8 illustrates an example dual display information handling system in book mode orientation according to an embodiment of the present disclosure.

FIG. 8 illustrates a book mode orientation 800 for the dual display information handling system embodiment of the present disclosure. In the embodiment of FIG. 8, a first display screen 810 and a second display screen 820 are connected via a hinge 830 having a hinge azimuth orientation at approximately 0° or parallel to the sight line of a viewer. The hinge is designed so that the dual display information handling system may be arranged in an open position at approximately 90° relative angle between the two display screens and where the front of both display screens are viewable. A range of dual tablet orientation hinge angles, or the relative hinge angle between the two display screens, is contemplated with both display screens to be viewed with images in portrait page orientation. In one example embodiment, it is contemplated that book mode orientation have a relative hinge angle of between approximately 20° and approximately 180°. Note that this may overlap somewhat with one embodiment of portrait page orientation for a dual screen device in double tablet orientation mode.

Figure 9:
FIG. 9 illustrates an example dual display information handling system in media display mode orientation according to an embodiment of the present disclosure.

FIG. 9 illustrates a media display mode orientation 900 for the dual display information handling system embodiment of the present disclosure. In the embodiment of FIG. 9, a first display screen 910 and a second display screen 920 are connected via a hinge 930 having a hinge azimuth orientation at approximately 90° or a hinge line perpendicular to the sight line of a viewer. The hinge is designed so that the dual display information handling system may be arranged in an open position at approximately 305° relative angle between the two display screens and where the front of one display screen is viewable and the other display screen is face-down. However, a range of relative hinge angle between the two display screens is contemplated in media display mode orientation 900 however. In one example embodiment, it is contemplated that media display mode orientation have a relative hinge angle of between approximately 250° and approximately 340°. Note that this may overlap somewhat with one embodiment of portrait page orientation tent orientation mode described below. However, in media display mode orientation 900, one display screen is generally facing in a downward orientation and unlikely to be viewable.

Figure 10:
FIG. 10 illustrates an example dual display information handling system in tent display mode orientation according to an embodiment of the present disclosure.

FIG. 10 illustrates a tent mode orientation 1000 for the dual display information handling system embodiment of the present disclosure. In the embodiment of FIG. 10, a first display screen 1010 and a second display screen 1020 are connected via a hinge 1030 having a hinge azimuth orientation at approximately 90° or a hinge line perpendicular to the sight line of a viewer. The hinge is designed so that the dual display information handling system may be arranged in an open position at approximately 305° relative angle between the two display screens and where the front of one display screen is viewable on one side while the other display screen is viewable on the other side. In an example embodiment, a range of relative hinge angles between approximately 180° and 350° between the two display screens is contemplated for tent mode orientation 1000. When both display screens are to be viewed with images in landscape page orientation from opposite sides, tent mode orientation may take effect. In one example embodiment, it is contemplated that tent mode orientation have a relative hinge angle of between approximately 200° and approximately 340°. Portrait page orientation mode viewing is also contemplated in some embodiments of tent mode orientation. Note that the relative hinge angle may overlap with other embodiments, such as one embodiment of media display mode orientation or even single or dual table mode.

Each orientation mode is not necessarily separate from other orientation modes in available ranges of relative angle or hinge azimuth orientation of the hinge. Moreover, all angles including hinge azimuth angles relative to a viewer's line of sight are approximate and may vary substantially. For example, in hinge azimuth angles a variance may be up to +/−30°. This is due, for example, to variation of a viewer's position while using the dual display information handling system including substantial range of view point, head position, and body position. Relative hinge angles may also vary by several degrees of orientation and may be set to any range of relative angles that meet the functional needs of the usage mode. The usage mode selected by the display dual display power management system may depend on the working software application context of the running software applications as well as input from sensors detecting states of usage activity of the dual display information handling system.

Figure 11:
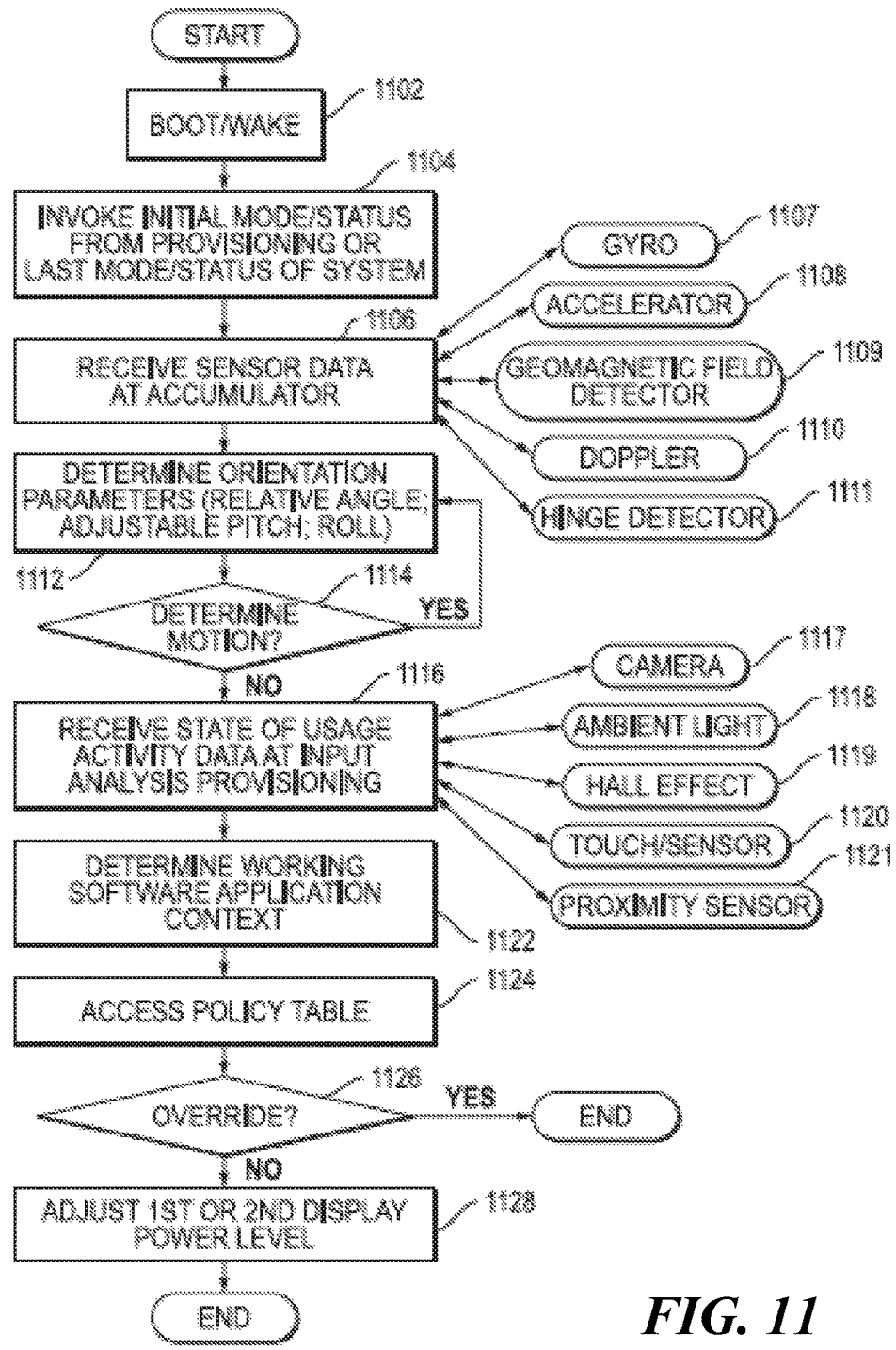
FIG. 11 is a flow diagram illustrating an example system for determining power savings for a dual display information handling system depending on orientation of displays and working software application context.

FIG. 11 shows a flow diagram illustrating implementing a dual display power management system for a dual display device according to one embodiment of the disclosure. Sensor data, state of usage activity data, and working software application context data are received and processed to determine the orientation, motion, usage and running software application environment of the dual display information handling system. The power management application then selects a power management strategy to automatically engage if policy parameters are triggered, unless an override status exists or an override command is received. The dual display device is then placed in a power management state that implements the power management strategy.

The process begins at 1102 where the dual display information handling system is booted up or wakes from a dormant sleep state. The boot kernel will invoke an initial power management state or mode from provisioning that is default to the dual display information handling system upon boot up at 1104. Upon a wake command from a dormant state, the most recent power management state and mode stored in a memory device by the display dual display power management system may be invoked by the processors at 1104. Alternatively, the system may resort to a default power management state and mode, such as from provisioning, upon receiving a wake command at 1104.

Proceeding to 1106 of the present embodiment, an accumulator sensor hub receives sensor data relating to orientation of the dual display information handling system. Multiple orientation sensors in the dual display information handling system, including duplicate types of sensors as described in more detail above, may send data to the sensor hub. The sensor hub collects this data at 1106. As described above with reference to FIG. 3, the sensor hub may perform a fusion and grooming of the raw sensor data into a useable form of positional data for the dual display information handling system and its display screens. In one embodiment, the sensor hub may communicate and receive data from the following sensors via a bus connection such as I2C: a digital gyroscope 1107, an accelerometer 1108, a geomagnetic field sensor 1109, a Doppler shift detector 1110, and/or an electric-mechanical hinge angle sensor 1111. One or more of these sensors may not communicate with the sensor hub, but may instead communicate directly with the processor chipset. For example, the Doppler shift detector 1110 may be one or more microphones that directly connect to the processor chipsets via the audio system and its controllers. Other sensors, such as usage activity state sensors discussed below may be connected though the sensor hub for fusion and grooming of raw sensor data, or they may be connected directly to the processor chipset operating the dual display power management system code instructions. By way of example, the ambient light sensor or the Hall Effect sensor discussed below, are contemplated as connecting through a sensor hub microcontroller.

At 1112, a processor such as the CPU determines what the orientation parameters are and matches those orientation parameters to one or more device orientation modes. For example, the processor running code instructions of a power management application may determine relative angle between two display screens and hinge azimuth orientation. The power management application also may determine 3-D spatial orientation of the dual display information handling system as a whole and the orientation of one or more of its display screens. Proceeding to 1114, the dual display power management system determines if there is additional ongoing motion by the dual display information handling system. If so, the system proceeds back to 1112 to re-determine relative angle and hinge azimuth orientation parameters to further determine a new possible orientation mode of the device for the next usage. Some motion, such as motion due to travel in a vehicle may alter sensor data such as geomagnetic field values, but should not trigger this recalculation. So a threshold of motion detection level must be reached to indicate a configuration transformation at 1114.

If no configuration transformation motion is detected at 1114, the flow proceeds to 1116 where usage activity state data is received. State usage activity sensors may include a camera 1117, an ambient light sensor 1118, a Hall Effect sensor system 1119, a touch or hover sensor 1120, and a proximity sensor 1121. Each usage activity state sensor may be operated by independent drivers. Some, such as the touch/hover system may even have its own controller. As stated above, these usage activity state sensors may also be connected via the sensor hub microcontroller or may connect directly to the dual display power management system operating on processors in the core chipset(s).

Proceeding to 1122, the dual display power management system for the dual display information handling system determines the working software application context. The system determines which software application context category the working software application(s) fall into. Upon determining the software applications context of the dual display information handling system, the flow proceeds to 1124 to access a policy table to determine a usage mode selection from orientation criteria, working software application context criteria, and usage activity state criteria.

Examples of usage mode characteristics that may be used selected from by the display mode selector of the dual display power management system are shown below in Table 1.

TABLE 1

| TYPE | APPROXIMATE ORIENTATION | EXAMPLE POWER | WORKING CONTEXT |
|---|---|---|---|
| Laptop | Relative hinge angle 85° to 135°; Hinge azimuth at 0° and lying flat on surface. | Top display at high brightness level; Base display (keyboard) dimmed to 50-90% | Office applications; email; websurfing; video; other applications where a top display is primarily viewed. |
| Book mode | Relative hinge angle 0° to 160°; Hinge azimuth at 90°. | Power modification based on gaze or active window determination; CPU power reduced; camera power not reduced. | Reading; note taking; websurfing. |
| Dual tablet mode | Relative hinge angle 160° to 200°. | Side-by-side displays in portrait page orientation or landscape page orientation; Power modification based on gaze or active window determination. | Reading; note taking; Office applications; websurfing; gaming; web apps; music; other applications. |
| Dual tablet mode | Relative hinge angle 160° to 200°. | Both displays act as single display. | Office applications, websurfing, video; gaming; web apps; music; reading; other applications. |
| Tent mode | Relative hinge angle 200° to 340°; Hinge azimuth at 90°. | Power down back display. | Media consumption such as video; music; websurfing; presentations; other applications. |
| Tent mode | Relative hinge angle 200° to 340°; Hinge azimuth at 90°. | Duplicate display driver initiated; both displays powered. | Dual screen sharing context with media consumption or other applications. |
| Media display mode | Relative hinge angle 250° to 340°; Hinge azimuth at 90°; one display screen face-down. | Power down face-down display. | Media consumption such as video; music; video; websurfing; presentations; websurfing; other applications. |
| Tablet mode | Relative hinge angle 340° to 360°. | Power down bottom or back display. | Reading; notetaking; Office applications; video; music; websurfing; web apps; presentations; other applications. |

Proceeding to decision diamond 1126, the dual display power management system determines whether an override command has been received or an override status has been set or changed to disable the dual display power management system activity. A general override command may be received to disable the dual display power management system of the dual display information handling system. Alternatively, override commands or settings may be specific to each power management action executed to reduce power consumption for a usage mode at 1126. In the latter case, the override will be effective upon determination by the dual display power management system of the determined usage mode as described above.

Proceeding to 1128, the dual display power management system will execute commands for a power saving strategy in accordance with the determined usage mode. The power saving strategy is executed in an embedded controller in the processor chipset(s) which manage a battery management unit (BMU) as part of a power management unit (PMU) in the BIOS/firmware operating on the main CPU processors as part of the power operating system. The PMU (and BMU) control power provision to the display screens and other components of the dual display information handling system. In an example embodiment, the dual display power management system may determine to power down a display screen into a sleep mode depending on the usage mode determined by the display mode selector. In an alternative embodiment, the dual display power management system may elect to reduce power to one or both screens depending on usage mode. Power reduction may be achieved by dimming the backlighting of the screen or may be achieved by reducing the refresh rate set by the display driver for the reduced display screen. Other power reduction effects may also be deployed for one or both display screens as understood in the art.

Figure 12:
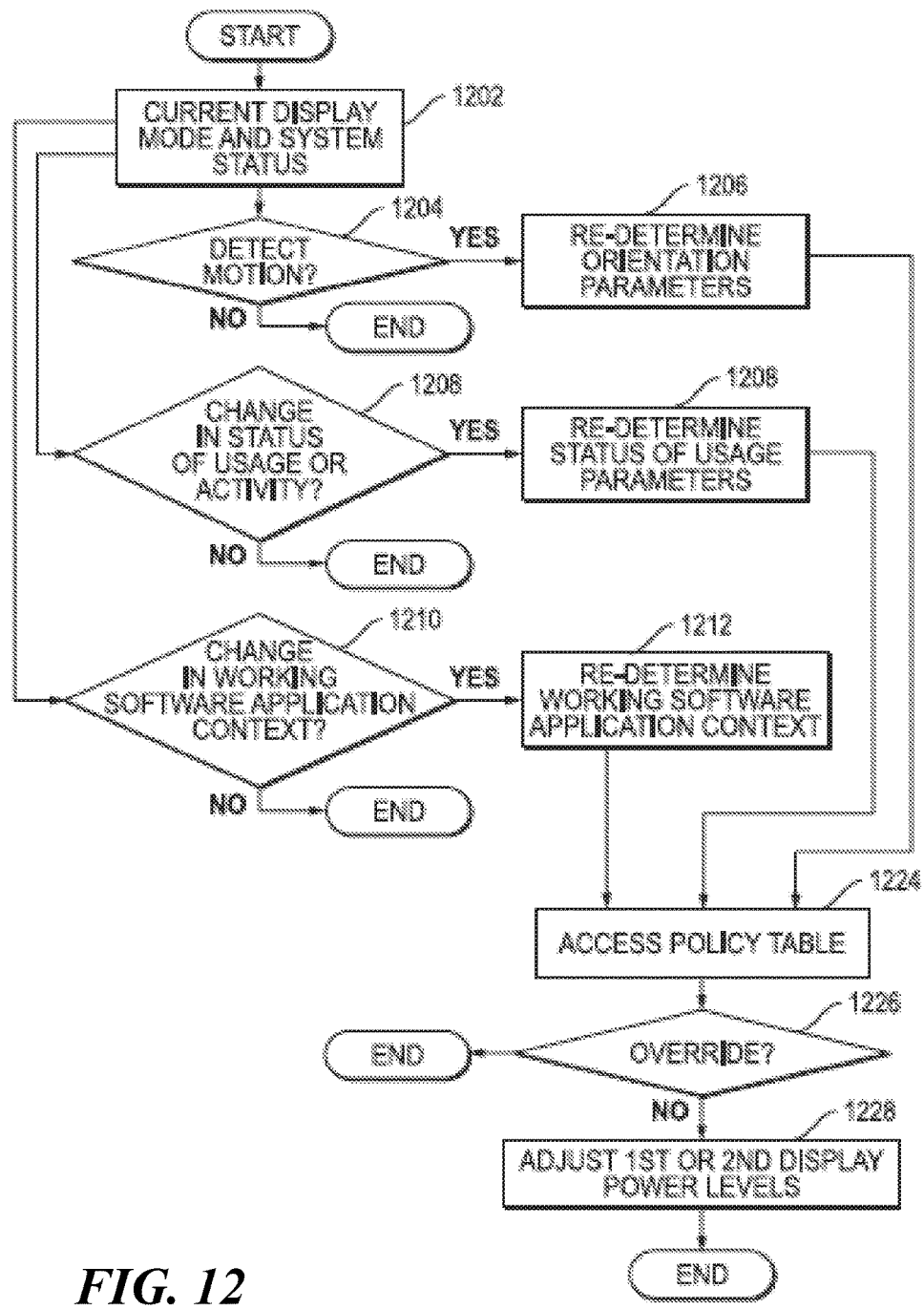
FIG. 12 is a flow diagram illustrating another example system for determining power savings for a dual display information handling system depending on orientation of displays and working software application context.

FIG. 12 illustrates adjustments made to the dual display information handling system indicating a change in orientation, usage activity state or working software application context. Such adjustments may include for example changing the configuration of the dual display information handling system during usage or switching to a different active software application or applications. The dual display power management system of the dual information handling system monitors these adjustments. Beginning at 1202, the system has a currently determined display usage mode and potentially a deployed power saving strategy. At decision diamond 1204, the dual display power management system receives data input detecting motion. Such motion may be via accelerometer or digital gyroscope for example. Upon detection of motion, the dual display power management system proceeds to 1206 where the orientation parameters are recalculated by the sensor hub and the processor operating the dual display power management system code instructions. The dual display power management system determines that the motion has settled in a new static position to indicate a new dual display information handling system configuration of display screens. This new static position includes the caveat that some motion still be possible without triggering a re-determination such as minor adjustments by the user or travel in a vehicle as discussed above. At 1208, a state sensor indicates a change in state of usage or activity of the dual display information handling system. Upon receiving indication of a change in a sensor indicator, the dual display power management system re-determines the state of usage parameters for the dual information handling system. At 1210, the dual display power management system operating on the processor chipset detects a change in active software. The system proceeds to 1212 to re-determine the working software application context and categorize the active application or applications operating on the dual display information handling system. Any combination of the orientation parameters 1206, the state of usage parameters 1208, and the working software application context 1212 may be changed by the user. Those re-determined parameters or contexts are utilized by the dual display power management system at 1224 to access a policy table to determine a usage mode selection from orientation criteria, working software application context criteria, and usage activity state criteria. The display mode selector of the dual display power management system selects from the policy table, such as Table 1 above to determine the new display usage mode.

Proceeding to decision diamond 1226, the dual display power management system determines whether an override command has been received or an override status has been set or changed to disable the dual display power management system determination or one or more specific power savings implementations as described above.

Proceeding to 1228 if there is no override, the dual display power management system will execute commands for a power saving strategy in accordance with the determined usage mode. The power saving strategy is executed in an embedded controller in the processor chipset(s) which manage a battery management unit (BMU) as part of a power management unit (PMU) in the BIOS/firmware of the dual display information handling system as described above.

Table 2 shows example level settings for power savings strategies for either display screen in the dual display information handling system. The example settings of the embodiment of Table 2 may be applied to either screen depending on the usage mode and sensor inputs received.

TABLE 2

Power Savings Characteristics

| BRIGHTNESS | TCON + DRIVERS + LCD | BACKLIGHT + DC-DC/ DRIVERS | ENERGY TOTAL |
| --- | --- | --- | --- |
| 0 nits (off) | 0.100 | 0 | 0.100 W |
| 200 nits (~50%) | 0.100 | 0.530 | 0.630 W |
| 450 nits (~100%) | 0.100 | 1.228 | 1.328 W |

Table 2 is only one example of settings. It is contemplated that other brightness levels may be used to scale to the ~100% level. For example, display brightness may scale up to 600 nits and power levels may reach or exceed 1.5 W. Additionally, more segmented scaling of brightness levels may be optimal based on software application contexts and tasks to be accomplished on either or both display screens. This is particularly true with nit levels that reach or exceed power usage levels of 1.5 W or more. More brightness levels with lower power consumption, but still sufficient brightness may be appropriate for settings of working software application contexts on a display screen given certain state of usage activity and orientation parameters.

Referring back to the display usage modes described in Table 1, several example embodiment power saving strategies may be deployed to reduce power consumption by either display screen without degradation of usage experience. In one embodiment, the dual display information handling system may be determined to be in book mode and operating a reading application. State of usage input from a camera system may detect user gaze at the first display screen while a reading software application is being utilized. In response, the above-described dual display power management system may elect to dim the second display screen to ~50%. The system may also elect to lower the contrast ratio on the second display screen so the second display screen is less distracting relative to the first display screen. Upon the user's gaze changing to the second display screen, the camera gaze detection sensor will update the state usage activity parameter. The system will adjust accordingly and switch the power saving strategy deployed. New commands will dim the first display screen to ~50% while returning the second display screen to full brightness. The contrast ratios may be adjusted in conjunction with this change as well so that the second display screen returns to a normal contrast while the first display screen contrast ratio is reduced. It is contemplated that the response may not occur with only a gaze change that amounts to a glance. A threshold change in gaze will trigger the change in power savings strategy with the potential for a transition between adjusting dimness between the screens. For example, there may be a transition time where both screens are fully bright to allow for the user to glance back and forth between screens. After the transition time, the first screen may then be dimmed according to the above discussion.

In an additional power saving strategy, the dimmed screen in the above embodiment may be considered dormant after a period of time. For a reading application where the content is periodically refreshed from the display device driver, the power saving system may employ an additional power savings measure. The system may elect to reduce the refresh rate of the content on the dimmed screen. Alternatively, the system may elect to use only the image from the last frame buffer update and not refresh until the dimmed screen is activated by a state usage sensor or orientation sensor input. This will limit GPU churn for the display screen that has been dimmed and designated as dormant. Upon activation, the previously-dormant display screen will return to its normal refresh rate (e.g. 60 Hz in many instances) and jump to the current version of the content to be displayed there. Variations on the several power saving adjustment strategies described in this paragraph are contemplated in any combination of individual strategies or all strategies.

In another example embodiment, the dual display information handling system may be determined to be in book mode and operating a note taking application. In this mode, the gaze detection state usage data may be used implement a power savings strategy similar to the above strategy with the reading application. Alternatively, the touchscreen/hover system may detect interaction with the first display screen but no interaction with the second display screen. The lack of activity on the second display screen relative to the first display screen causes a power savings strategy to be deployed where the second display screen is dimmed to ~50%. The second display screen may also have its contrast ratio reduced to limit distraction from that screen. As before, the dimmed screen may be designated dormant after a period of time and the additional measure of reducing refresh rate or only displaying the most recent frame buffer contents may be deployed to minimize usage of the GPU for the dormant display screen. Upon a switch of gaze or touch/hover feedback from the sensor associated with the second display screen, that display screen may be returned to full brightness and normal contrast ratio. After a transition period with inactivity or no gaze at the first display screen, the power savings strategy deployed may generate commands to reduce the brightness and contrast ratio of the first display screen. Variations on the several power saving adjustment strategies described in this paragraph are contemplated in any combination of individual strategies or all strategies.

In another example embodiment, the dual display information handling system may be determined to be in tent mode. The dual display power management system detects which screen is being viewed, or in the case where the dual display information handling system has a designated primary screen (e.g. the display screen having a camera device), the viewed screen or primary screen remains activated while the second display screen or back display screen opposite the user is powered down. The dual display power management system then must determine if the state of usage activity includes dual screen sharing whereby the second display screen or back screen is being viewed by another user. This may be done via a prompt to a user on one display screen such as a primary display screen about dual sharing activity usage. Affirmative feedback would trigger a dual sharing usage mode. Alternatively, first and second cameras or first and second proximity sensors on the respective display screens can determine the presence of two users and activate a dual sharing activity usage state for both display screens in tent mode. With dual screen sharing mode, the dual information handling system provides for duplicate display driver initiation to provide a duplicate image on both display screens. As an alternative embodiment, the display screens may operate independently allowing each user to interact with the screen and applications on the dual display information handling system as desired. In dual screen sharing mode, both screens will be powered and set to a default brightness setting.

The dual display information handling system may be determined to be in media display mode in another embodiment. The dual display power management system detects which screen is being viewed, or which screen of the dual display information handling system is oriented downward and unlikely to be viewed. For example, the orientation detection sensors and system may detect the dual screen system configuration as having one display screen facing downward. A proximity sensor on the downward facing display screen may also detect a surface such as a tabletop, lap, or other surface upon which the dual display device is resting. In this particular case, media display mode is determined as the usage mode for the dual display information handling system. The dual display power management system then provides for commands to power down the downward facing screen and turning off such a screen will reduce or eliminate GPU processing for that screen. In an alternative embodiment, the dual display information handling system may have a designated primary screen (e.g. the display screen having a camera device) which is designated as the powered display screen such that a secondary screen must be placed facing downward during media display mode. Thus, the dual display power management system will determine to power down the secondary screen when this orientation is detected. In another alternative, first and second cameras, first and second proximity sensors, or first and second ambient light sensor may be used to detect a state activity usage mode whereby the dual screen system is oriented with one screen resting face down on a surface. This sensor input may determine media display mode and trigger powering down the downward-facing display screen.

The dual display information handling system may be determined to be in tablet mode in another embodiment whereby the relative hinge angle is 340° to 360°, or fully open. The dual display power management system receives state usage activity data indicating that the system is being used as a single tablet. For example, a Hall Effect sensor in the back of each display screen may be triggered to indicate a completely open dual display device where one screen is unlikely to be viewed. In another example, the orientation detection sensors and system may detect that the dual screen system configuration has one display screen facing downward. Or alternatively, a proximity sensor, ambient light sensor, or camera on the bottom display screen may also detect a surface such as a tabletop, lap, or other surface upon which the dual display device is resting. A camera on the active display screen may also be used to detect a user. Upon determination that the orientation of the dual display information handling system is in a tablet usage mode with one screen facing down or away from the user, the dual display power management system then provides for commands to power down the away or downward facing screen. Turning off such a screen will reduce or eliminate GPU processing for that screen. In an alternative embodiment, the dual display information handling system may have a designated primary screen (e.g. the display screen having a camera device) which is designated as the powered display screen in tablet mode such that a secondary screen must be placed facing downward or away during tablet mode. Thus, the dual display power management system will determine to power down the secondary screen when the tablet usage mode orientation is detected. In another alternative, first and second cameras, first and second proximity sensors, or first and second ambient light sensor may be used to detect a state activity usage mode whereby the dual screen system is oriented with one screen resting face down on a surface. This sensor input may determine media display mode and trigger powering down the downward-facing display screen.

In yet another embodiment, the dual display information handling system may be determined to be in laptop mode and operating an office or email-type application. The software application context may indicate the presence of a touchscreen keyboard for one of the display screens, namely a base or lower display screen. Other application content is presented on the other display screen. The display screen orientated as the base display screen with a virtual keyboard need not be powered at full brightness. Therefore, the dual display power management system may set the base or bottom display screen to ~50% level or other reduced level of brightness. The system may also elect to increase the contrast ratio on the base or lower display screen so that the virtual keyboard keys are still sufficiently viewable by the user. The top screen presenting the other application content may be powered to full brightness or other desired brightness level. In an additional power saving strategy, the dimmed lower or base screen have a reduced the refresh rate of the virtual keyboard reduce GPU function for that screen. And as before, variations on the several power saving adjustment strategies described in this paragraph are contemplated in any combination of individual strategies or all strategies.

Figure 13:
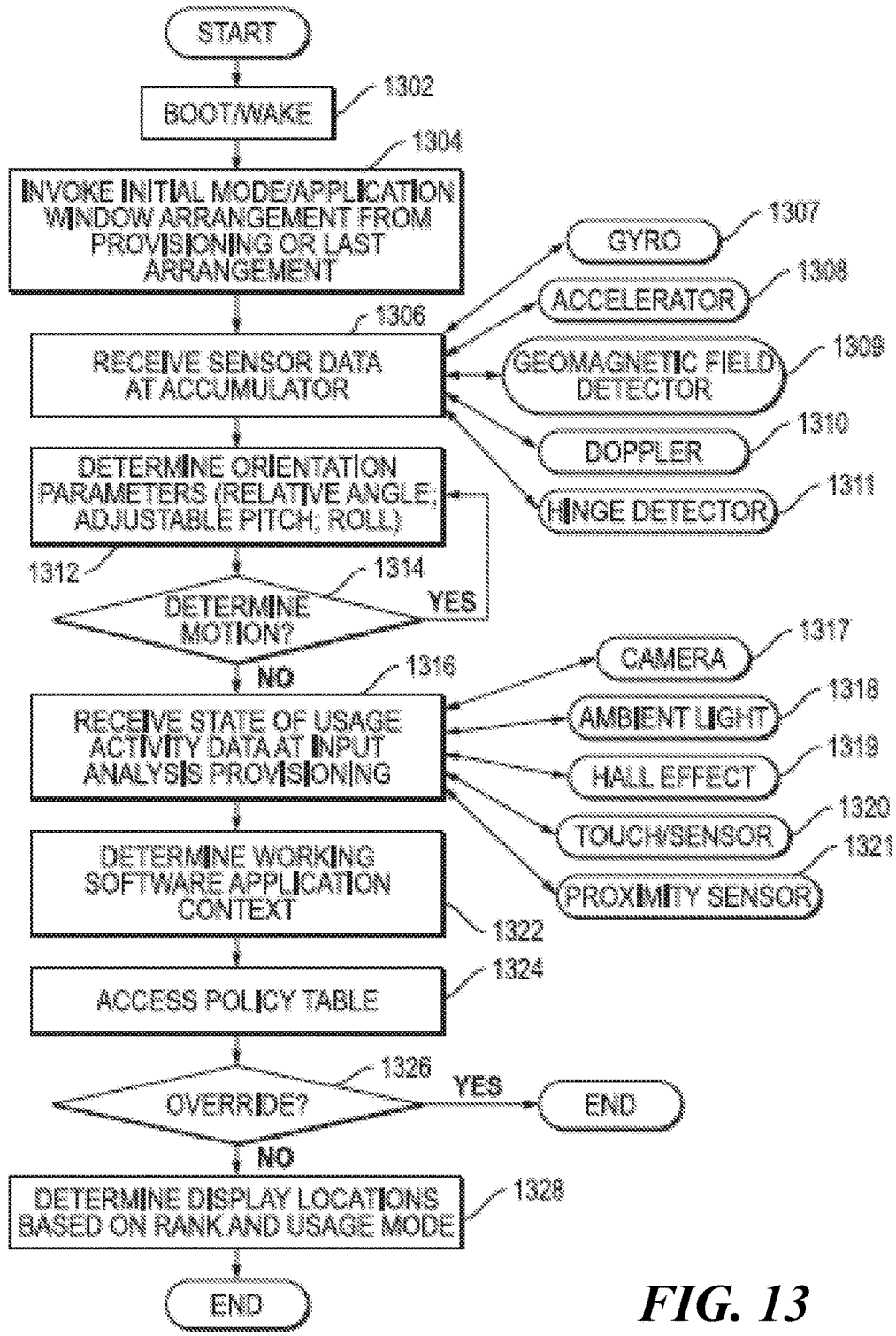
FIG. 13 is a flow diagram illustrating an example system for determining logical position software application windows for a dual display information handling system depending on orientation of displays and working software application context.

FIG. 13 shows a flow diagram illustrating implementing a software application window locator system for a dual display device according to one embodiment of the disclosure. Sensor data, state of usage activity data, and working software application context data are received and processed to determine the orientation, motion, usage and running software application environment, including operating states and priority rank of simultaneously running software applications. The software application window locator application then locates software application display windows and virtual tools for display on the dual display device based on priority rank of the operating states for each software application. In some cases, only software applications with higher operating state ranks may be displayed while lower ranked software applications may be minimized or prioritized under (i.e., hidden) software application display windows on the top viewed layer of the displays. The software application display windows are located automatically based on whether policy parameters are triggered. An override status or an override command may disable the automatic software display window arrangement by the software application window locator. The arrangement of the software application display windows and any virtual tools are then rendered on the dual displays of the dual display device.

The process begins at 1302 where the dual display information handling system is booted up or wakes from a dormant sleep state. The boot kernel invokes software application windows for software applications initiated upon boot-up from provisioning and these software application windows are located in default locations at 1304 based on an initial orientation mode. Upon a wake command from a dormant state, the most recent arrangement of software application windows stored in a memory device by the display dual display device application locator system may be invoked by the processors at 1304. Alternatively, the system may resort to a default software application display window arrangement, such as from provisioning, upon receiving a wake command at 1304.

Proceeding to 1306 of the present embodiment, an accumulator sensor hub receives sensor data relating to orientation of the dual display information handling system. Multiple orientation sensors in the dual display information handling system, including duplicate types of sensors as described in more detail above, may send data to the sensor hub. The sensor hub collects this data at 1306. As described above, the sensor hub may perform a fusion and grooming of the raw sensor data into a useable form of positional data for the dual display information handling system and its display screens. In one embodiment, the sensor hub may communicate and receive data from the following sensors via a bus connection such as I2C: a digital gyroscope 1307, an accelerometer 1308, a geomagnetic field sensor 1309, a Doppler shift detector 1310, and/or an electric-mechanical hinge angle sensor 1311. One or more of these sensors may not communicate with the sensor hub, but may instead communicate directly with the processor chipset. For example, the Doppler shift detector 1310 may be one or more microphones that directly connect to the processor chipsets via the audio system and its controllers. Other sensors, such as usage activity state sensors discussed below may be connected though the sensor hub for fusion and grooming of raw sensor data, or they may be connected directly to the processor chipset operating the dual display power management system code instructions. By way of example, the ambient light sensor or the Hall Effect sensor discussed below, are contemplated as connecting through a sensor hub microcontroller.

At 1312, a processor determines what the orientation parameters are and matches those orientation parameters to one or more device orientation modes. For example, the processor running code instructions for a display mode selector in an application locator system may determine relative angle between two display screens and hinge azimuth orientation. The display mode selector of the application locator system also may determine 3-D spatial orientation of the dual display information handling system as a whole and the orientation of one or more of its display screens. Proceeding to 1314, the dual display device application locator system determines if there is additional ongoing motion by the dual display information handling system.

If so, the system proceeds back to 1312 to re-determine relative angle and hinge azimuth orientation parameters to further determine a new possible orientation mode of the device for the next usage. Some motion, such as motion due to travel in a vehicle may alter sensor data such as geomagnetic field values, but should not trigger this recalculation. Thus, a threshold of motion detection level must be reached to indicate a configuration transformation at 1314.

If no configuration transformation motion is detected at 1314, the flow proceeds to 1316 where usage activity state data is received. State usage activity sensors may include a camera 1317, an ambient light sensor 1318, a Hall Effect sensor system 1319, a touch or hover sensor 1320, and a proximity sensor 1321. Each usage activity state sensor may be operated by independent drivers. Some, such as the touch/hover system, may even have its own controller. As stated above, these usage activity state sensors may also be connected via the sensor hub microcontroller or may connect directly to the dual display power management system operating on processors in the core chipset(s).

Proceeding to 1322, the application locator system for the dual display information handling system determines the working software application context. The application locator system determines a priority of the working software applications. More particularly, the context selection module determines which software applications are active and consults a policy table to determine which applications would likely require higher priority for a user's attention versus those that would likely require less attention on the dual display device. Part of this ranking depends on the operating state of the software applications. For example, a web browser being actively reviewed or interacted with would have a higher operating state rank than the same software application conducting a passive download of information. An application having an operating state requesting input via a virtual tool, such as a virtual keyboard or virtual navigation device, would also indicate active attention from a user and require a higher priority rank. A videoconferencing application with an incoming call or an ongoing video conference will have an elevated operating state rank relative to the same application with no active video conference call. Upon determining the software applications context and operating states of the applications running on a dual display information handling system, the flow proceeds to 1324 to access a policy table to determine a display location and priority of the running software applications. This depends in part on the usage mode selection from relative orientation criteria, working software application context rankings, and usage activity state criteria.

Examples of operating state ranking in view of usage mode characteristics in a policy table used by an application locator system of the dual display power management system are shown below in Table 3.

TABLE 3

Usage Mode Characteristics and Application Operating State Rank

| TYPE | RANK (1-5; 5 = HIGHEST) | CONTEXT OPERATING STATE | EXAMPLE LOCATION |
|---|---|---|---|
| Laptop; Media display mode; tablet mode | 5 | Video conference active. | Top display has software application window (e.g., primary display, should have integrated camera) |
| Dual tablet mode; Book Mode; Tent mode | 5 | Video conference active. | One display (e.g., primary display) displays software application window. |
| Laptop; Dual tablet mode (landscape page) | 4 | Software application requests data input via virtual tool: for example, Office applications; email; websurfing; gaming. | Top display displays software application window; Base display displays virtual keyboard, other applications take lower priority. |
| Dual tablet mode (portrait page); Book Mode | 4 | Software application requests data input via virtual tool: for example, Office applications; email; websurfing; gaming. | One display (e.g., a primary display) displays software application window and virtual keyboard beneath; Second display screen may have lower priority applications. |
| Dual tablet mode (portrait or landscape page); Book Mode | 3 | Software application display window is actively being interacted with via touch or stylus or actively viewed (gaze) by user. For example, reading, note taking, websurfing. | Software application display window remains in current location with high priority. |
| Laptop | 3 | Software application display window is actively being interacted with or actively viewed (gaze) by user. For example, Office applications, email, websurfing, gaming. | Software application display window remains in current location with high priority. |
| Tent mode; Media display mode; tablet mode. | 3 | Media consumption such as video; music; websurfing; presentations; other applications. | Display software application window on screen facing user. |

TABLE 3-continued

Usage Mode Characteristics and Application Operating State Rank

| TYPE | RANK (1-5; 5 = HIGHEST) | CONTEXT OPERATING STATE | EXAMPLE LOCATION |
|---|---|---|---|
| Laptop | 2 | Software application display window is not subject of active interaction by user. | If higher priority application is active, base display displays software application subject to virtual keyboard if available. Alternatively, software application window is hidden or minimized. |
| Dual tablet mode (portrait or landscape page); Book Mode | 2 | Software application display window is not subject of active interaction by user. | If higher priority application is active, second (e.g., non-primary) display displays software application subject to virtual keyboard if available. Alternatively, the software application window is hidden or minimized. |
| Dual tablet mode (portrait page); Book Mode; Laptop mode; Tent mode; Media display mode; tablet mode. | 2 | Video conference application not active. | If higher priority application is active, second (e.g., non-primary) display displays software application subject to virtual keyboard if available. Alternatively, the software application window is hidden or minimized. |
| Dual tablet mode (portrait page); Book Mode; Laptop mode; Tent mode; Media display mode; tablet mode. | 1 | Data downloading; music streaming. | Lowest priority displays software application window in second or bottom display screen if available; otherwise hidden or minimized. |

Table 3 is but one example embodiment of a policy table for use with an application locator system as described in several embodiments herein. The ranking scale may involve any number of levels and may include more or less rank levels than four. The number of working software contexts and operating states may also be more granular and involve more policy table entries. The policy table entries may be more specifically tailor location outcomes to usage mode types or working software contexts. Additionally, the policy table may be customizable to reflect preferences of a user for placement and priority rank of software applications under various operating states. For example, a user may not want to be interrupted when a video conference call comes in above other software application activity and set up a customized "do not disturb" setting lowering the rank of video conference call applications.

Proceeding to decision diamond 1326, the dual display device application locator system determines whether an override command has been received or an override status has been set or changed to disable the application locator system activity. A general override command may be received to disable the application locator system of the dual display information handling system. Alternatively, override commands or settings may be specific to each application locator system action executed to locate software application display windows or virtual tools for a usage mode at 1326. In example case, the override command may be an action by a user, received via touch input or other input, to move, minimize, or elevate one or more software display windows differently from the software application display window arrangement determined by the application locator system.

Proceeding to 1328, the application locator system will execute commands for locating software application display windows and virtual tools in accordance with the software application context ranking and determined usage mode. The determination of the priority ranking and locations of the software display windows is executed in an embedded controller in the processor chipset(s) which manages commands to a display manager or windows manager in the BIOS/firmware operating on the main CPU processors as part of the operating system or on the GPU as part of the display system. The display manager controls commands for displaying, locating and maintaining software application display windows or virtual tools to be rendered on the dual display screens via the display device driver(s).

In an example embodiment, the application locator system may determine to prioritize a software application requesting input via a virtual tool and locate the application display window and virtual tool in the same display or on two different displays depending on the usage mode selected. Further discussion of this embodiment is below. The requesting software application and virtual tool will be ranked ahead of software applications with a lower operating state rank.

In an alternative embodiment, the application locator system may prioritize actively used software applications, such as those having detected interaction or viewing by a user, over software applications running in a manner not as acutely requiring a user's visual attention. For example, the application locator system may rank an operating state for a software application being actively viewed or interacted with above an operating state for a software application downloading data or streaming music. In such an embodiment, the application locator system will elevate other more highly ranked software application display windows or virtual tools above the non-active or downloading application. Higher ranked software application display windows will be located for viewing on one or both of the display screens. For almost any usage mode, the software application display windows for lower ranked non-active or downloading applications may be displayed on a secondary display screen if available, hidden behind other software application display windows, or minimized. If non-active or downloading applications are displayed on a second display screen, then in one embodiment the dual display power management system may work in combination with the application locator system to dim the second display screen as a power savings strategy as well.

In another example embodiment, the dual screen information handling system may be determined to be in book mode and operating a reading application. State of usage input from a camera system may detect user gaze at the first display screen while a reading software application is being utilized. In response, the above-described application locator system will highly rank the reading application with an operating state having the gaze attention of the viewer. The application locator system will elevate the reading application above most other software applications in the multitasking environment. In one embodiment, the application locator system will keep the reading application display window as highest priority on the display screen being viewed to avoid interrupting the user. In an alternative embodiment, the user may have designated a primary screen preference and if the reading application with gaze attention is the highest operating state rank, the application locator system may locate the reading application display screen on the primary screen.

In another embodiment, the application locator system may prioritize an active video conference application or incoming video conference call above all other software applications and place the video conference application display window on a display screen with an integrated camera. In some cases, the dual screen device has only one integrated camera. The display screen with the integrated camera will likely be designated as the primary display screen in that instance. In laptop usage mode, the video conference application display window will appear in the top display screen if both display screens have integrated cameras. In tent mode, the video conference application display window will appear in the user-facing display screen if both display screens have integrated cameras. In dual tablet mode when both display screens are in a usage mode to act as a single display, then the video conference application display window is displayed across both display screens. If the display screens display separate information side by side in dual tablet mode or the usage mode is book mode, then the video conference application display window will display on the primary display screen which can be either display screen depending on designation. Alternatively, gaze location or proximity detection of the user may determine the display screen used if both display screens have integrated cameras. Once the video conference has terminated, the operating state rank is lowered for the video conference application. Then other, higher ranked software applications will be located on the two display screens via the application window locator system.

If a video conference application display window is displayed on a primary screen, then in one embodiment the dual display power management system may work in combination with the application locator system to dim the second display screen as a power savings strategy as well during the active video conference unless an override command is received such as touch feedback to the second screen.

Many variations are contemplated on the embodiments using the application locator system alone and in combination with the dual display power management system in establishing automatic locations of software application display windows and virtual tools as well as deploying power savings strategies.

Figure 14:
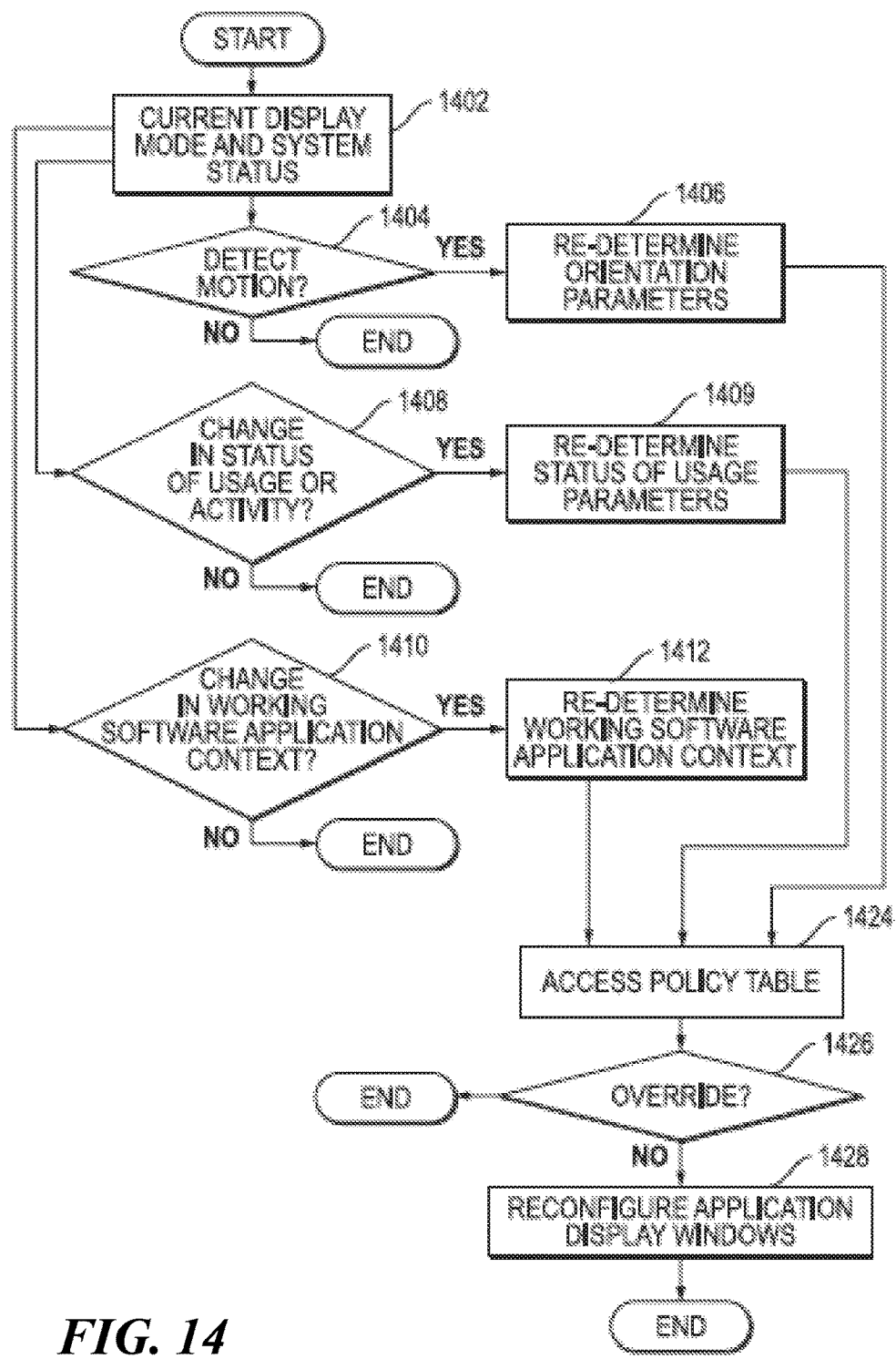
FIG. 14 is a flow diagram illustrating another example system for determining logical position software application windows for a dual display information handling system depending on orientation of displays and working software application context.

FIG. 14 illustrates adjustments made to the dual display information handling system indicating a change in orientation, usage activity state or working software application context. This may include a change in operating state rank in the working software application context, a change in physical orientation of the dual screen device, or a change in location or usage by the user via usage state activity data. Such adjustments may include for example changing the configuration of the dual display information handling system during usage, switching to a different active software application or applications, having a change occur in an active software application that changes operating state rank, or repositioning of the user with respect to the dual screen device. The application locator system of the dual information handling system monitors these adjustments. Beginning at 1402, the currently determined display usage mode and location arrangement of software application display windows and virtual tools is established.

At decision diamond 1404, the application locator system receives data input detecting motion. Such motion may be via accelerometer or digital gyroscope for example. Upon detection of motion, the application locator system proceeds to 1406 where the orientation parameters are recalculated by the sensor hub and the processor operating the dual display power management system code instructions. The application locator system determines that the motion has settled in a new static position to indicate a new dual display information handling system configuration of display screens and may be used to determine a usage mode. This new static position includes the caveat that some motion still be possible without triggering a re-determination such as minor adjustments by the user or travel in a vehicle as discussed above.

At decision diamond 1408, a state sensor indicates a change in state of usage or activity of the dual display information handling system. Upon receiving indication of a change in a sensor indicator, the application locator system re-determines the state of usage parameters for the dual information handling system at 1409.

At decision diamond 1410, the application locator system operating on the processor chipset for the dual display device detects a change in active software. The system proceeds to 1412 to re-determine the working software application context and rank the active software application operating states for applications operating on the dual display information handling system. Any combination of the orientation parameters 1406, the state of usage parameters 1408, and the working software application context 1412 may be changed. Those re-determined parameters or contexts are utilized by the application locator system at 1424 to access a policy table. The application locator system re-determines usage mode selection from orientation criteria, working software application context operating states, and usage activity state criteria. The application locator system selects from the policy table, such as Table 3 above, to determine ranking of the software applications based on operating states and orientation modes.

Proceeding to decision diamond 1426, the application locator system determines whether an override command has been received or an override status has been set or changed to disable the application locator system determination for one or more specific application locator system actions as described above.

Proceeding to 1428 if there is no override, the application locator system will execute commands for locating the software application display windows and virtual tools in accordance with the determined usage mode and software application operating state rankings. Commands for locating software application windows and virtual tools are delivered to a display manager to locate and track the rendering of these on the dual display device via the GPU and display device driver(s).

The application operating states and usage modes described above in Table 3 are but an example policy table for determining rankings of operating states as they correspond with usage modes. These several example embodiment operating state rankings and display locations may be deployed to facilitate quick and efficient access to desired software applications in a multitasking environment running on a dual screen information handling system. The automatic display of software applications with higher operating state ranking provides a better and more fluid user experience with a dual screen system in determining where to find or view software applications. In one alternative embodiment, rankings, parameters, and window location choices may be entirely customizable by the user to permit preferences to be reflected in the application locator system actions.

In another alternative embodiment, one of the two display screens may be designated as a primary screen while the second display screen is a lower priority screen. In an example, the primary display screen may have an integrated camera whereas the secondary screen may not. In another example, the primary display screen and secondary display screen may be interchangeable by the user via customizable settings for the application locator system. With the designation of a primary screen and secondary screen, the location of higher ranked software application display windows will be on the primary display over lower priority software application display windows displayed on the second display screen, subject to the location of virtual tools in instances such as those described in Table 3 above.

Figure 15:
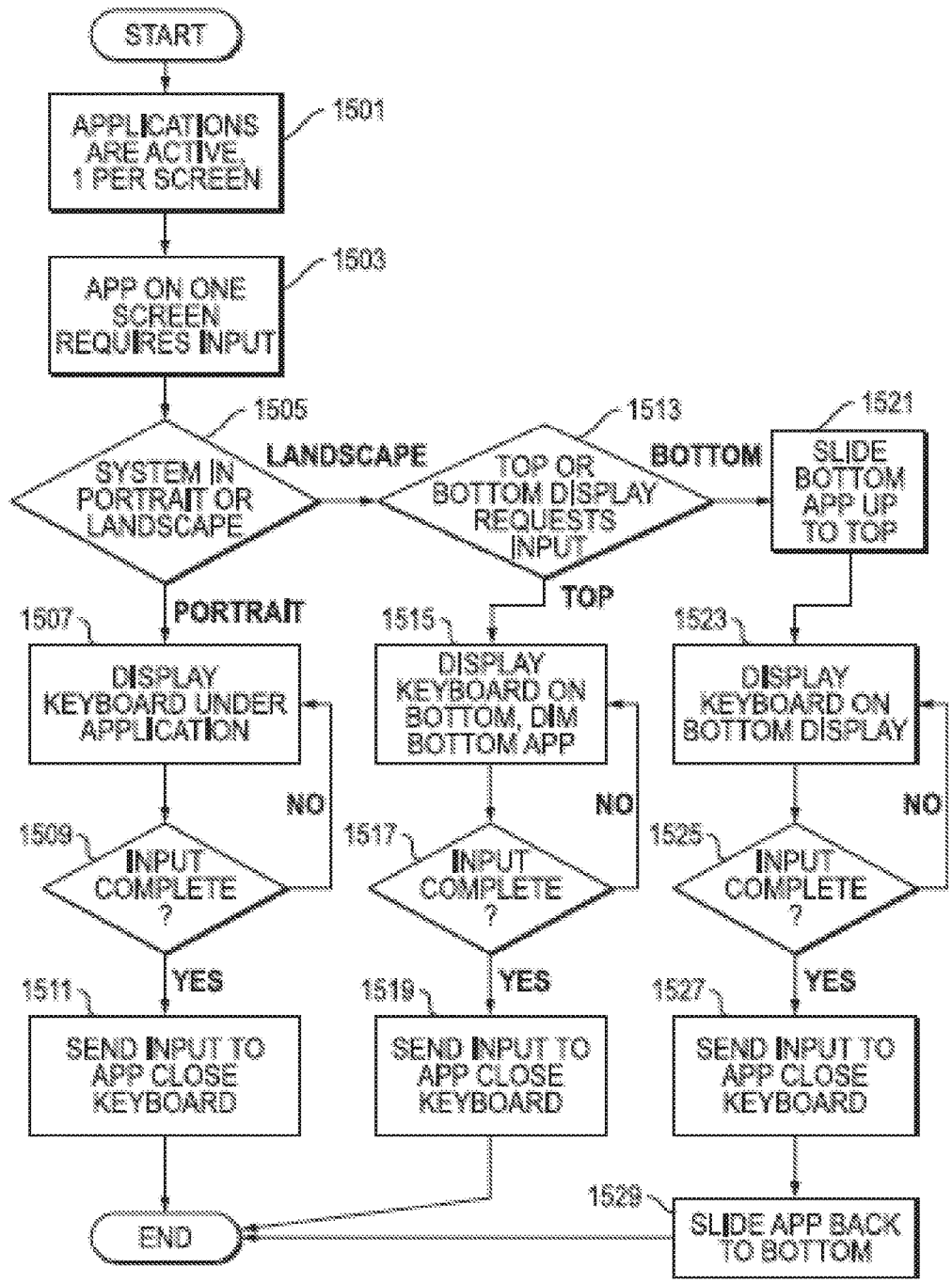
FIG. 15 is a flow diagram illustrating an example system for determining logical position software application windows and a virtual tool for a dual display information handling system depending on orientation of displays and working software application context.

FIG. 15 illustrates one embodiment of the operation of the application locator system to locate software application display windows and virtual tools according to disclosures herein. At 1501, the dual display information handling system has two applications active with one application per screen as detected by the application context module. The display mode selector may also determine the relative orientation of the dual screen device. A first software application requires input at 1503 and calls up a virtual tool such as a virtual keyboard. This changes the operating state rank of the first software application. For example from policy Table 3, the rank may elevate to a rank of 4 or some other rank ahead of the operating state rank of the second software application.

Proceeding to decision diamond 1505, the application locator system determines if the dual information handling system is being viewed in portrait page orientation or landscape page orientation. If in portrait page orientation, the flow proceeds to 1507 where the application locator system determines to locate the virtual keyboard on the same display screen as the first software application under its software application display window. The application locator system has thus determined that the relative orientation for a usage mode is in dual tablet mode or book mode with both of the dual screens viewable. The commands are sent to the display manager to control rendering the virtual keyboard on the display screen with the first software application according to the policy table. At 1509, the system determines whether the input via the virtual keyboard is complete. If so, the operating state rank returns to its previous level and data is sent to the software application to close the keyboard at 1511. If the input is not complete, the virtual keyboard remains available for user input.

If however, the application locator system determines that the dual information handling system is being viewed in landscape page orientation at 1505, the flow proceeds to decision diamond 1513. In this case, the application locator system has thus determined that the relative orientation is in dual tablet mode or laptop mode with both of the dual screens viewable. At decision diamond 1513, the application locator system determines whether the display screen with the first software application requesting input is the top screen or bottom screen. In an example embodiment, the top screen may be designated as the primary screen when the dual screen information handling system is in laptop mode. If the display screen with the first software application is the top screen relative to the location of the viewer, then the application locator system locates the virtual keyboard on the bottom screen at 1515. The application display window for the first software application remains on the top screen. In an additional embodiment variation, a power savings measure may be employed to dim the second application on the second bottom display screen and also dim the virtual keyboard on the bottom screen in accordance with the power savings strategies such as those set forth above, for example those in Table 1 for laptop or dual tablet modes.

Commands are sent to the display manager to control rendering the virtual keyboard on the bottom screen according to the policy table requirements. At decision diamond 1517, the system determines whether the input via the virtual keyboard is complete. If so, the operating state rank returns to its previous level and data is sent to the software application to close the keyboard at 1519. If the input is not complete, the virtual keyboard remains available for user input on the bottom display screen.

If the application locator system determines that the display screen with the first software application requesting input is the bottom display screen relative to the viewer at decision diamond 1513, then the flow proceeds to 1521. At 1521, the application locator system relocates software application display window for the first software application to the top display screen according to policy requirements. This may be the primary display screen if the dual screen information handling system is in laptop mode for example. The application locator system accesses the policy table to determine a location for the virtual keyboard on the bottom screen at 1523. Then commands are sent to the display manager to control rendering the virtual keyboard on the bottom screen according to the policy table. At 1525, the system determines whether the input via the virtual keyboard is complete. If so, the operating state rank returns to its previous level and data is sent to the software application to close the keyboard at 1527. If the input is not complete, the virtual keyboard remains available for user input on the bottom display screen. The flow proceeds to 1529 where the software application display window for the first software application is returned to the original bottom display screen and the process ends.

Returning to FIG. 1, this block diagram shows the dual display information handling system 10 capable of administering each of the specific embodiments of the present disclosure. Some additional detail of another embodiment of system 10 may include the processor chipset 108 with the CPU 105, GPU 106, or both. Moreover, system 10 can include main memory 109 and static memory or disk drive 110 that can communicate with each other via one or more buses 118. As shown, system 10 may further include dual video display screens 125 and 135, such as liquid crystal displays (LCD), organic light emitting diode (OLED) displays, flat panel displays, or solid state displays. Additionally, system 10 may include optional external input device 115 such as a keyboard, and a cursor control device such as a mouse. System 10 can also include a signal generation device or receiving device, such sound sensors 156, remote control, and a network interface device 40. System 10 can represent a server device whose resources can be shared by multiple client devices, or it can represent an individual client device, such as a desktop personal computer.

Dual display information handling system 10 can include a set of instructions that can be executed to cause the computer system to perform any one or more of the methods or computer based functions disclosed herein. System 10 may operate as a standalone device or may be connected such as using a network, to other computer systems or peripheral devices.

In a networked deployment, dual display information handling system 10 may operate in the capacity of a server or as a client user computer in a server-client user network environment, or as a peer computer system in a peer-to-peer (or distributed) network environment. System 10 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, system 10 can be implemented using electronic devices that provide voice, video or data communication. Further, while a single information handling system 10 is illustrated, the term "system" shall also be taken to include any collection of systems or sub-systems that individually or jointly execute a set, or multiple sets, of instructions to perform one or more computer functions.

The main memory unit 109 and disk drive unit 110 may include a computer-readable medium in which one or more sets of instructions such as software can be embedded. The disk drive unit 110 also contains space for data storage. Further, the instructions may embody one or more of the methods or logic as described herein. In a particular embodiment, the instructions may reside completely, or at least partially, within main memory 109, the static memory or disk drive unit 110, and/or within the processor chipset(s) 108 during execution by the system 10. The main memory 109 and the processor chipset 108 also may include computer-readable media. The network interface device 40 can provide connectivity to a network 50, (e.g. a wide area network (WAN)), a local area network (LAN), wireless network, or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium of main memory 109 and static memory or drive unit 110 that includes instructions or receives and executes instructions responsive to a propagated signal; so that a device connected to a network interface device 40 can communicate voice, video or data over the network 50. Further, the instructions may be transmitted or received over the network 50 via the network interface device 40.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a primary integrated display device housing and a second integrated display device housing attached via a hinge;
a processor to determine a first relative orientation of the primary integrated display device housing to the second integrated display device housing from a plurality of orientation sensors;
the processor to determine a working software application context by detecting at least a first software application running on the information handling system wherein the working software application context further includes an operating state rank of the first software application relative to other software applications;
the processor detecting a required user input to the first software application; and
an application window locator system for altering a location of a first software application display window and a virtual input softkey on a display device and selecting between the primary integrated display device housing and the second integrated display device housing based on the first relative orientation and displacing second software application window of a second software application with a previously-higher the operating state rank,
wherein the first relative orientation is selected from a plurality of orientation modes determined from hinged relative angle positions of the primary integrated display device housing to the second relative display device housing.

2. An information handling system of claim 1, wherein the virtual input softkey further comprises a virtual keyboard relative to the first software application window.

3. The system of claim 2, further comprising:
the processor determines that the first relative orientation is viewed in portrait page orientation relative to a viewer location; and
the application window locator system locating the virtual keyboard under the first software application display window on the primary integrated display device.

4. The system of claim 2, further comprising:
the processor determines that the first relative orientation is viewed in landscape page orientation relative to a viewer location;
the application window locator system locating the virtual keyboard on the second integrated display device; and
the application window locator system locating the first software application display window on the primary integrated display device.

5. The system of claim 1, wherein the first relative orientation further is determined from a hinge azimuth orientation.

6. The system of claim 1, wherein the first software application requiring user input is located on the primary integrated display device housing for viewing by a user on the first relative orientation for the information handling system.

7. The system of claim 1, further comprising:
the primary integrated display device further includes an integrated camera; and
the first software application is an active videoconference application with an incoming videoconference call requiring user input.

8. A computer-implemented method of locating software application display windows for an information handling system having a first integrated display device housing connectably hinged to a second integrated display device housing, comprising:
determining, via a processor executing instructions, a first relative orientation of the first integrated display device housing to the second integrated display device housing from a plurality of orientation sensors;
determining the location of a software application display window and a virtual tool for a first software application on the first integrated display device housing or the second integrated display device housing based on the first relative orientation and an operating state rank of the first software application;
determining that the first software application requires user input wherein the first software application includes an operating state rank relative to other software applications on the information handling system; and
altering a location of a first software application display window and a virtual input softkey on a display device and displacing second software application window of a second software application with a previously-higher the operating state rank via an application window locator system in response to detecting that the first software application requires user input.

9. The method of claim 8, wherein first relative orientation is determined from hinged relative angle positions of the first integrated display device to the second integrated display device and from a hinge azimuth orientation.

10. The method of claim 8, wherein first relative orientation is is selected from a plurality of orientation modes including at least a laptop mode, a book mode, and a double tablet mode.

11. The method of claim 8, further comprising:
detecting a viewer location based on the orientation mode.

12. The method of claim 8, further comprising:
detecting a viewer location via a camera integrated in the information handling system.

13. The method of claim 12, further comprising:
locating the software application display window for the second software application on the first or second integrated display device housing determined to be further from the detected viewer location.

14. The method of claim 8, wherein altering the location of the first software application display window and the virtual input softkey on the display device facing a viewer location via the application window locator system in response to detecting that the first software application requires user input locates the first software application display window.

15. The method of claim 8, further comprising:
determining that the first software application has received completed user input to satisfy the required user input; and
in response to determining that the first software application has received completed user input, returning the first software application display window to its previous location.

16. An information handling system comprising:
a display device;
a primary integrated display device housing and a second integrated display device housing attached via a hinge;
a processor to determine a first relative orientation of the primary integrated display device housing to the second integrated display device housing from a plurality of orientation sensors;

the processor to determine an operating state rank of a first software application running on the information handling system relative to an operating state rank of other software applications;

the processor detecting a required user input to the first software application; and the processor executing code of an application window locator system for altering a location of a first software application display window and a virtual input softkey on a display device and selecting between the primary integrated display device housing and the second integrated display device housing based on the first relative orientation and displacing second software application window of a second software application with a previously-higher the operating state rank in response to detecting that the first software application requires user input, wherein the first relative orientation is selected from a plurality of orientation modes including at least a laptop mode, a book mode, and a double tablet mode.

17. The system of claim 16, further comprising:

the processor elevating the first software application operating state rank above the second software application operating state rank upon determining that the first software application requires a user input and the second software application is loading data.

18. The system of claim 16, wherein the first relative orientation is selected from a plurality of orientation modes determined from hinged relative angle positions of the primary integrated display device housing to the second relative display device housing.

19. The system of claim 16, wherein the first relative orientation is in the double tablet mode, further comprising:

the processor to determine that a first software application requests input from the virtual input softkey the includes a virtual keyboard;

the application window locator system locating the virtual keyboard on an integrated display device closest the detected location of a viewer relative to the information handling system; and the application window locator system orienting the virtual keyboard according to the detected location of the viewer.

20. The system of claim 16, further comprising:

the application window locator system locating the virtual input softkey for use with the first software application on an integrated display device housing that is a bottom integrated display device housing when the first relative orientation is in the laptop mode.

\* \* \* \* \*